(12) United States Patent
Chen et al.

(10) Patent No.: US 10,453,315 B1
(45) Date of Patent: Oct. 22, 2019

(54) HAPTIC ENGINE HAVING MOVING COIL STRUCTURE POWERED BY SUSPENDED FLEXIBLE PRINTED CIRCUIT WITH MULTIPLE TRACES

(71) Applicant: Apple Inc., Cupertino, CA (US)

(72) Inventors: Denis G. Chen, San Jose, CA (US); Scott D. Ridel, Redwood City, CA (US); Shingo Yoneoka, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/024,679

(22) Filed: Jun. 29, 2018

(51) Int. Cl.
*G08B 6/00* (2006.01)
*G06F 3/01* (2006.01)
*G01D 5/20* (2006.01)

(52) U.S. Cl.
CPC ............. *G08B 6/00* (2013.01); *G01D 5/2033* (2013.01); *G06F 3/016* (2013.01)

(58) Field of Classification Search
CPC ...... G06F 3/016; G06F 3/0338; G06F 1/1616; G08B 6/00; H01H 2003/008; H01H 2215/052; H02K 33/16; H02K 7/02
See application file for complete search history.

(56) References Cited

U.S. PATENT DOCUMENTS

| 8,063,892 B2 | 11/2011 | Shahoian et al. |
| 9,690,390 B2 | 6/2017 | Olsson et al. |
| 2016/0141884 A1* | 5/2016 | Lee .......................... H02J 17/00 307/104 |
| 2016/0210615 A1* | 7/2016 | Lee .................... G06Q 20/3278 |
| 2017/0033652 A1 | 2/2017 | Mao et al. |
| 2018/0061191 A1 | 3/2018 | Alghooneh et al. |

FOREIGN PATENT DOCUMENTS

CN 103401395 A1 11/2013

* cited by examiner

*Primary Examiner* — Omeed Alizada
(74) *Attorney, Agent, or Firm* — Fish & Richardson P.C.

(57) ABSTRACT

A haptic engine in which a moving coil structure is powered by a suspended flexible printed circuit having multiple traces.

25 Claims, 10 Drawing Sheets

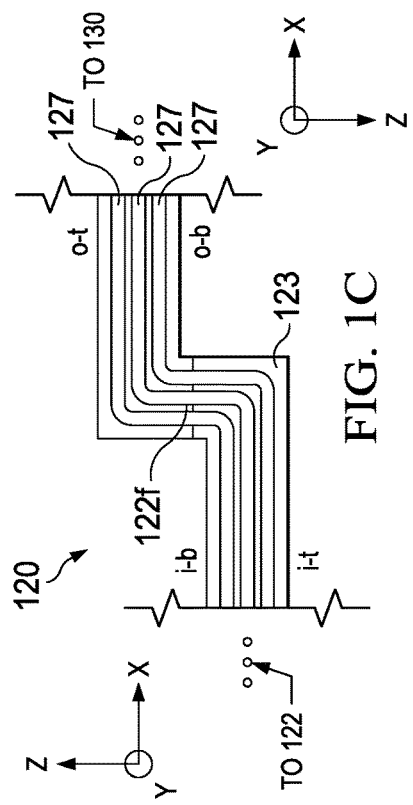
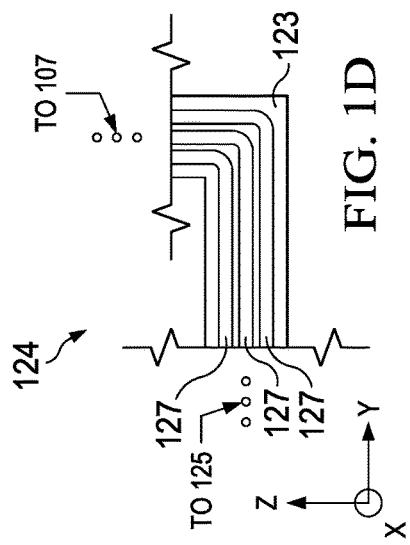
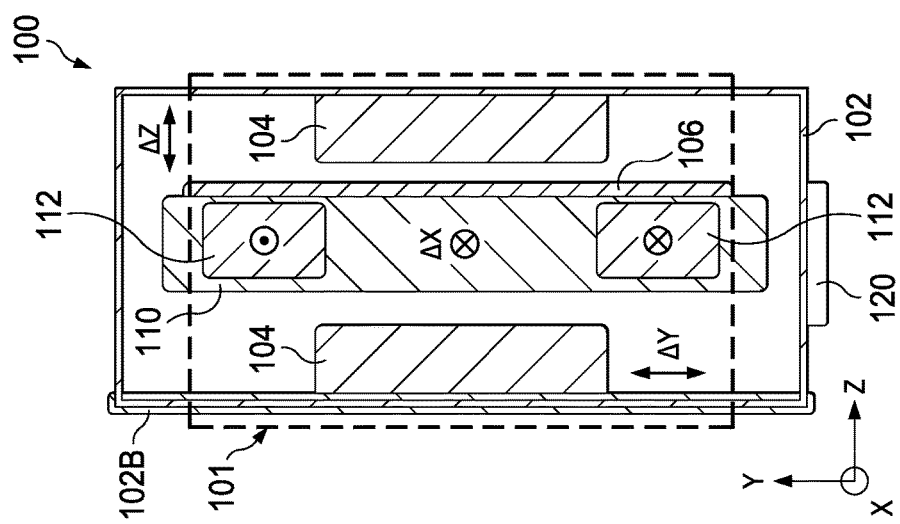
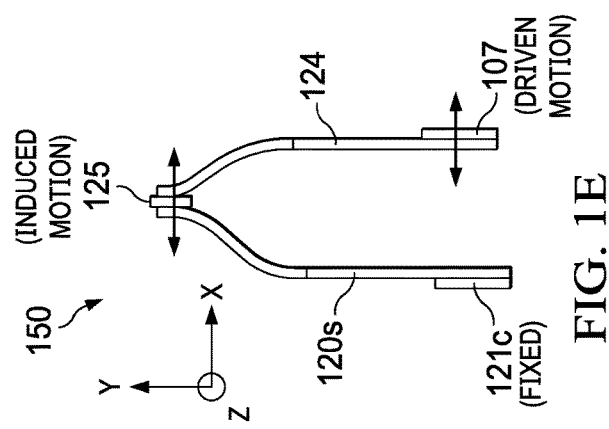

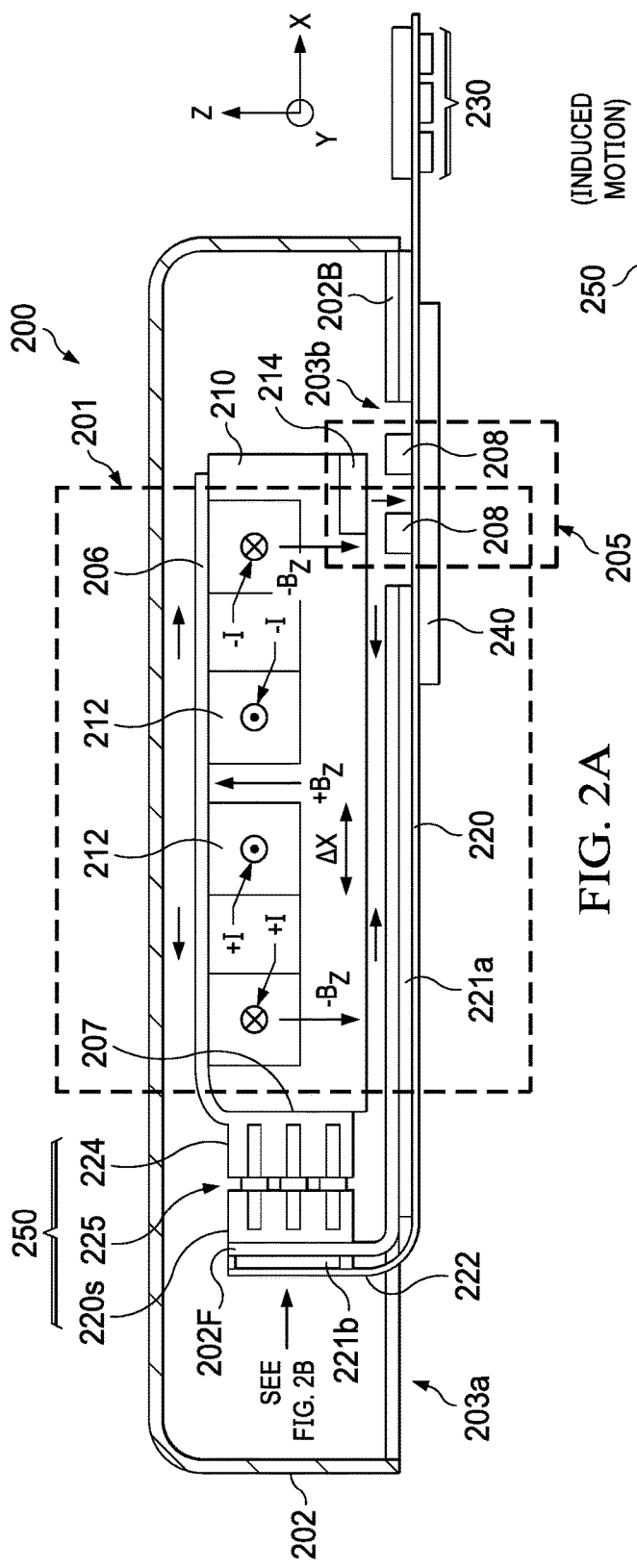
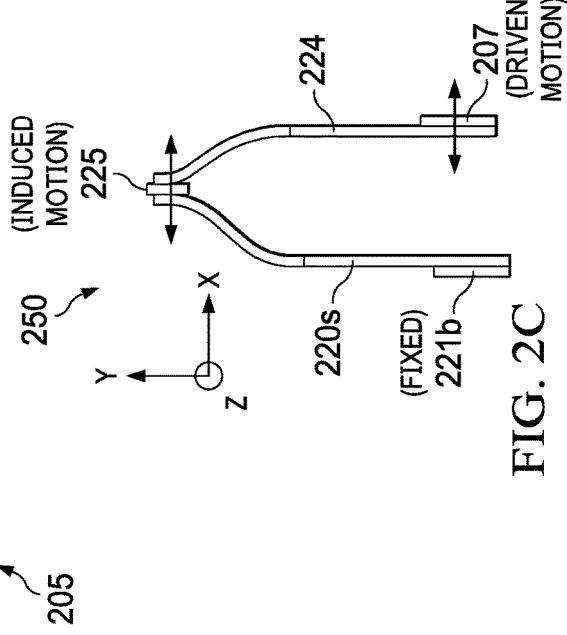
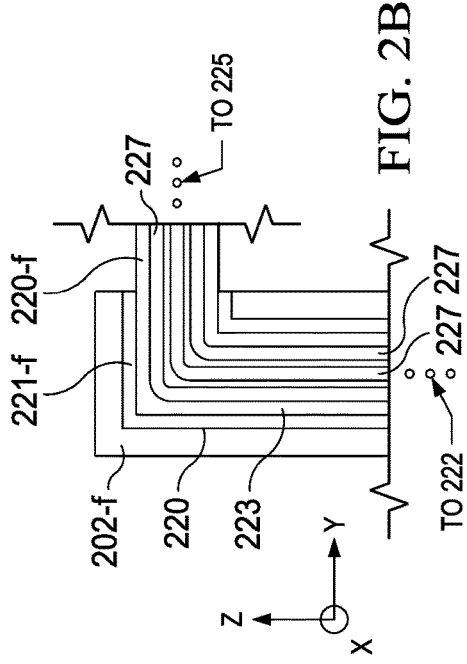
FIG. 2A
FIG. 2B
FIG. 2C

HAPTIC ENGINE HAVING MOVING COIL STRUCTURE POWERED BY SUSPENDED FLEXIBLE PRINTED CIRCUIT WITH MULTIPLE TRACES

TECHNICAL FIELD

This specification relates generally to haptic engine architectures, and more specifically, to a haptic engine in which a moving coil structure is powered by a suspended flexible printed circuit having multiple traces.

BACKGROUND

A haptic engine (also referred to as a vibration module) is a linear resonant actuator that determines one of acceleration, velocity and displacement of a moving mass. FIG. 8 shows a conventional haptic engine that has a housing and a mass arranged to move inside the housing. Here, the mass includes a stainless steel or tungsten cage that holds one or more coils. The conventional haptic engine also has one or more magnets (not shown in FIG. 8), which are affixed to the housing and correspond to the coils, and one or more sensing magnets (not shown in FIG. 8) which are attached to the cage. The conventional haptic engine further includes a primary flexible printed circuit (FPC) that is affixed to the housing to hold an array of magnetic-field sensors (not shown in FIG. 8). As such, the magnetic-field sensors are (i) spaced apart from the sensing magnet(s) along the z-axis, and (ii) disposed within the magnetic field provided by the sensing magnet(s). A displacement of the mass of the conventional haptic engine, when the mass is vibrated along the x-axis, is encoded in the magnetic field provided by the sensing magnet(s).

The primary FPC of the conventional haptic engine includes conductive traces. Some of the conductive traces of the primary FPC are used to carry, to a board-to-board (B2B) connector, sensing signals output by the magnetic-field sensors. A processor (not shown in FIG. 8) coupled with the conventional haptic engine through the B2B connector uses the sensing signals to determine the mass' displacement $\Delta X$ along the x-axis. A driving source (not shown in FIG. 8) coupled with the conventional haptic engine through the B2B connector provides driving currents to drive the coils. Some other of the conductive traces of the primary FPC are used to carry the driving currents from the B2B connector to driving nodes of the primary FPC. Each coil is connected to a corresponding driving node through a respective contact spring made from a conductive material. Note that, when the cage is in motion, a contact spring's end in contact with a driving node is at rest relative to the housing, while a contact spring's opposing end in contact with a coil port of the corresponding coil is moving along the x-axis, as dictated by the cage's motion. Typically, the coil port is part of a secondary flex (not shown in FIG. 8) affixed to the cage.

As shown in FIG. 8, when the cage carrying the coils is in motion along the x-axis, a first contact spring of a pair of contact springs expands and a second contact spring of the pair compresses to maintain electrical contact between the primary FPC and a first coil and a second coil, respectively. As illustrated, a volume reserved for the contact springs can be a significant fraction of the total volume of the cage. Additionally, the length of the contact springs, dictated by cage travel $X_{MAX}$, limits the use of the cage volume. That is so because the coils cannot be arranged in, or extended over, a volume of the cage extending along the length of the contact springs. This unusable cage volume can be used only as mass, and cannot be used for efficient coil arrangements that could improve engine efficiency.

Moreover, the contact springs and their connections add unwanted resistance to the coils. In addition, the contact springs are typically difficult to manufacture and assemble inside the conventional haptic engine illustrated in FIG. 8.

SUMMARY

This specification describes moving coil-based haptic engine architectures which can achieve higher engine force by arranging coils of a haptic engine more efficiently, e.g., by disposing and/or extending the coils in the previously unusable cage volume. For example, the disclosed technologies include directly connecting a primary flexible printed circuit (FPC) to a secondary FPC and routing multiple conductive traces on this FPC interface. Here, the primary and secondary FPCs serve both as electrical connections and also as mechanical flexures.

In general, one innovative aspect of the subject matter described in this specification can be embodied in haptic engines that include a housing; a cage disposed within the housing and arranged to be driven relative to the housing along a driving direction; and a driving system disposed within the housing. The driving system includes a magnet that is coupled with the housing to produce a magnetic field along a magnetic field direction orthogonal to the driving direction, and one or more coils supported by the cage and arranged to interact with the magnetic field to cause the cage to be driven when corresponding driving currents are being provided to the coils. The haptic engines further include flexible printed circuitry configured to provide the driving currents to the coils. The flexible printed circuitry includes (i) a primary flexible printed circuit (FPC) having a first primary FPC portion being attached to the housing, and a second primary FPC portion suspended inside the housing along a transverse direction orthogonal to the driving direction and the magnetic field direction, (ii) a secondary FPC attached to the cage and electrically connected to the coils, and (iii) an intermediary FPC having an end that is attached to the cage and electrically connected to the secondary FPC. Here, the intermediary FPC is suspended inside the housing along the transverse direction, and the intermediary FPC has an end distal from the cage that is attached, and electrically connected, to the second primary FPC portion at a joint. The joint is oriented parallel to the magnetic field direction and spaced apart from both the cage and the housing. Additionally, the haptic engines further include a sensing system having a first portion coupled with the housing and a second portion coupled with the cage. Here, the sensing system is arranged and configured to produce sensing signals corresponding to changes in position of the cage along the driving direction when supplying the driving currents to the coils.

The foregoing and other embodiments can each optionally include one or more of the following features, alone or in combination. In some embodiments, the housing can include a flange oriented parallel to the transverse direction and magnetic field direction, and an end of the first primary FPC portion adjacent to the second primary FPC portion is attached to the flange. In some cases, the first primary FPC portion can be attached to a top cover surface of the housing orthogonal to the transverse direction, and bends away from the top cover surface about a bending axis parallel to the magnetic field direction prior to attaching at the flange. In some cases, the first primary FPC portion can be attached to a base surface of the housing orthogonal to the magnetic field direction, and bends away from the base surface about a bending axis parallel to the transverse direction prior to attaching at the flange.

In some embodiments, the second primary FPC portion can be bent away from the housing about a bending axis parallel to the magnetic field direction, the bend being near the housing and distal from the joint. In some cases, the second primary FPC portion can have first thickness in a bend region and a second thickness outside the bend region, such that the first thickness is smaller than the second thickness. In some cases, the second primary FPC portion can have a first number of layers in a bend region and a second number of layers outside the bend region, such that the first number of layers is smaller than the second number of layers.

In any one of the foregoing embodiments of the haptic engines, electrical connections of the intermediary FPC with the second primary FPC portion and the secondary FPC can be formed through SMT reflow soldering, conductive adhesive gluing, or laser welding.

Another one innovative aspect of the subject matter described in this specification can be embodied in haptic engines that include a housing; a cage disposed within the housing and arranged to be driven relative to the housing along a driving direction; and a driving system disposed within the housing. The driving system includes a magnet that is coupled with the housing to produce a magnetic field along a magnetic field direction orthogonal to the driving direction, and one or more coils supported by the cage and arranged to interact with the magnetic field to cause the cage to be driven when corresponding driving currents are being provided to the coils. The haptic engines further include flexible printed circuitry configured to provide the driving currents to the coils. The flexible printed circuitry includes (i) a primary flexible printed circuit (FPC) attached to the housing along the direction of motion, and (ii) a secondary FPC having a first secondary FPC portion being attached to the cage and electrically connected to the coils, and a second secondary FPC portion being suspended inside the housing by bending away from the cage about a first bending axis parallel to the magnetic field direction, extending along a transverse direction orthogonal to the driving direction and the magnetic field direction, and bending toward the housing about a second bending axis parallel to the first bending axis. The second secondary FPC portion has an end distal from the cage that is attached to the housing and electrically connected to the primary FPC. Additionally, the haptic engines further include a sensing system having a first portion coupled with the housing and a second portion coupled with the cage, the sensing system arranged and configured to produce sensing signals corresponding to changes in position of the cage along the driving direction when supplying the driving currents to the coils.

The foregoing and other embodiments can each optionally include one or more of the following features, alone or in combination. In some embodiments, the haptic engines can include a fastener disposed on the cage to attach the second secondary FPC to the cage at a fastening location of the second secondary FPC. Here, the second secondary FPC bends away from the cage at the fastening location. In some embodiments, an electrical connection of the second secondary FPC portion with the primary FPC can be formed through SMT reflow soldering, conductive adhesive gluing, or laser welding.

In some embodiments, the second secondary FPC portion can have a first thickness in a bend region corresponding to either of the first or the second bending axes, and a second thickness outside the bend region, such that the first thickness is smaller than the second thickness.

In some embodiments, the second secondary FPC portion can have a first number of layers in a bend region corresponding to either of the first or the second bending axes, and a second number of layers outside the bend region, such that the first number of layers is smaller than the second number of layers.

In any one of the foregoing embodiments of the haptic engines, the flexible printed circuitry comprises multiple conducting traces to independently provide corresponding driving currents to individual ones of the coils. In some cases, the multiple conducting traces can provide connections between additional electrical components on the secondary FPC to the primary FPC, and the additional electrical components are different from the one or more coils.

In any one of the foregoing embodiments of the haptic engines, the sensing system can include a sensing magnet that is coupled with the cage and produces a sensing magnetic field along a sensing direction orthogonal to the driving direction, and a first Hall-effect sensor and a second Hall-effect sensor disposed on the first primary FPC portion attached to the housing at respective first and second locations of the housing. Here, the second location is separated from the first location along the driving direction. Each of the Hall-effect sensors are spaced apart from the sensing magnet along the sensing direction and configured to produce a respective on of the sensing signals as a Hall voltage signal corresponding to changes of the sensing magnetic field at the location of the respective one of the sensors caused when driving the mass. In some cases, the sensing direction can be parallel to the magnetic field direction. In some cases, the sensing direction can be orthogonal to the magnetic field direction.

In any one of the foregoing embodiments, the haptic engines can include mass blocks attached to the cage. Here, each mass block extends over a length of the cage along the driving direction and is disposed in corresponding inactive areas of the coils. In some cases, the mass blocks and the cage can include the same material. In some cases, the mass blocks and the cage can include different materials. In some cases, the mass blocks can be taller than the magnet coupled with the housing to prevent physical contact between the cage and the magnet during an uncontrolled motion event along the magnetic field direction.

Another one innovative aspect of the subject matter described in this specification can be embodied in displacement measurement systems that include one or more of the haptic engines of any one of the previous embodiments, and a digital signal processor configured to determine displacements of the mass based on the sensing signals.

Another one innovative aspect of the subject matter described in this specification can be embodied in computing systems that include one or more of the foregoing displacement systems. In some embodiments, the computing systems can include one of a smartphone, a laptop and a watch.

The subject matter described in this specification can be implemented in particular embodiments so as to realize one or more of the following advantages. For example, the disclosed haptic engines include fewer parts than the above-noted conventional haptic engines. As another example, the disclosed haptic engines are simpler to assemble than the above-noted conventional haptic engines. The primary and secondary FPC can be assembled onto the module housing and the moving cage respectively first before the two FPCs are connected in a final assembly step. This allows fully visual inspection on the subassemblies and the final assembly is compatible with established processes. As yet another example, the disclosed haptic engines make more efficient use of the cage volume compared to the above-noted conventional haptic engines.

Further, the disclosed haptic engines allow independent control of individual coils. Furthermore, the disclosed haptic engines use a primary FPC having a much smaller size than the above-noted conventional haptic engines, thus the primary FPC used here is typically less expensive. This is because the primary FPC only needs to make mechanical contact with the secondary FPC at one location as opposed to the two separate driving nodes in FIG. 8. The need for mechanically reaching two driving nodes arranged on a diagonal inside a rectangular shape (as in the case of the conventional haptic engine illustrated in FIG. 8) is particularly wasteful because the minimum outline of the primary flex will be this rectangle and the area in its middle is removed to make room for the driving magnets. The driving nodes typically have to be on a diagonal for the purpose of mechanically balancing the suspension flexures of a haptic engine.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-1E show aspects of a first example of a haptic engine.

FIGS. 2A-2C show aspects of a second example of a haptic engine.

Like reference numbers and designations in the various drawings indicate like elements.

DETAILED DESCRIPTION

Figure 1A:
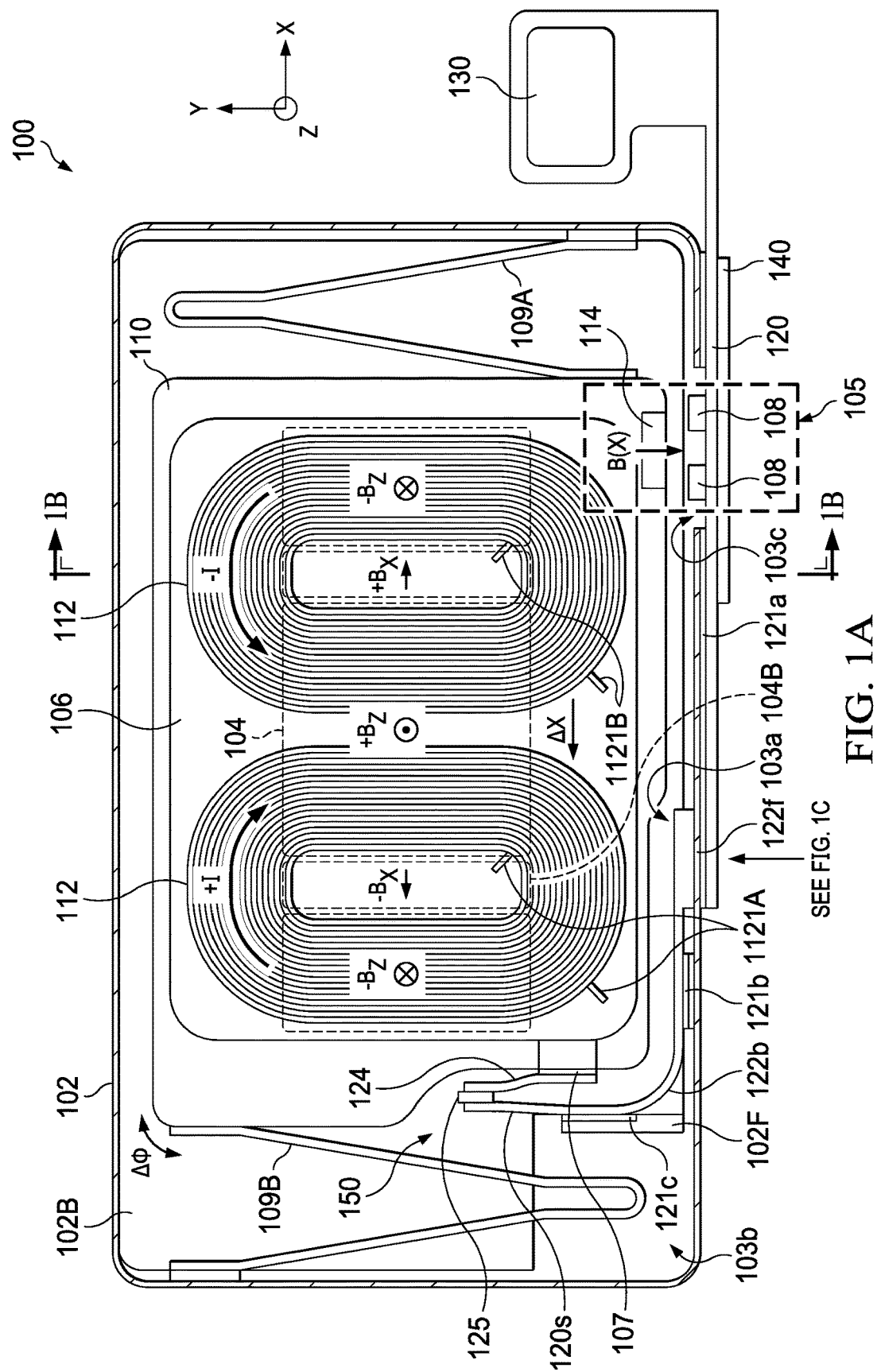

FIG. 1A is a plan view, e.g., in the (x,y)-plane, and FIG. 1B is a cross-section view, in the (y,z)-plane, of a first example of a haptic engine 100 in which a primary flexible printed circuit (FPC) 120 and a secondary FPC 106 are electrically coupled through a wishbone-shaped flexure 150. The haptic engine 100 has a housing formed from a base 102B and a top cover 102. Additionally, the haptic engine 100 includes a driving system 101 and a mass 110 that are enclosed between the housing top cover 102 and housing base 102B. The mass 110 is spaced apart from the housing surfaces and can be driven along a driving direction, in this example the x-axis, as described below.

The driving system 101 includes a stationary part and a moving part. In the example illustrated in FIGS. 1A-1B, the moving part includes a pair of coils 112, each of which being formed from a winding parallel to the (x,y)-plane. Moreover, the mass 110 is implemented as a cage (e.g., made from steel or tungsten) having enclosures configured to hold the coils 112. Note that the mass and the cage will be both referenced interchangeably by reference numeral 110. The secondary FPC 106 is disposed on the cage 110 and includes conductive traces for carrying corresponding driving currents to individual coils 112.

In this example, the cage 110 is constrained to move along the driving direction by using blade flexures 109A, 109B (also referred to as suspension flexures). In this manner, the moving part of the driving system 101 will be carried by the cage 110 when the cage is driven along the driving direction. The stationary part of the driving system 101 includes a pair of magnetic plates 104 affixed to housing surfaces that are parallel to the (x,y)-plane. As such, the cage 110 is sandwiched along the z-axis by the magnetic plates 104. The magnetic plates 104 include magnetic tiles that are distributed across the (x,y)-plane in a configuration similar to a Hallbach array to produce, inside the cage, a magnetic field $B_Z$ oriented along the z-axis, orthogonal to the driving direction, for driving the coils 112 along the driving direction. More specifically, for each coil held by the cage 110, a first subset of tiles of the magnetic plates 104 produce a magnetic field $B_Z$ that is parallel to the z-axis over a half of the coil winding, and anti-parallel to the z-axis over the other half of the coil winding. Additionally, a second subset of tiles 104B of the magnetic plates 104, which are disposed between the tiles of the first subset, produces a magnetic field $B_X$ that is parallel to the x-axis over a center region of a coil 112 and anti-parallel to the x-axis over a center region of an adjacent coil. The fringe of the alternating magnetic fields $B_X$ produced by the second subset of tiles 104B reinforces the alternating magnetic fields $B_Z$ in the coils 112, and cancel the magnetic fields $B_Z$ outside of the housing 102/102B. This tile arrangement of the magnetic plates 104 provides an increase in the haptic engine 100's efficiency (typically around 10% to 20% efficiency increase depending on the haptic engine's aspect ratio) while reducing leakage flux outside of the housing 102/102B.

A power source (not shown in FIGS. 1A-1B) supplies to the coils 112 driving currents having opposite circulations. For instance, when a counter-clockwise driving current is supplied to one of the coils 112, a clockwise driving current is supplied to the other one of the coils. As such, for the configuration of the magnetic field $B_Z$ produced by the magnetic plates 104 and at a time instance when the current circulation in the coils 112 is as illustrated in FIG. 1A, the coils experience a Lorentz force anti-parallel to the x-axis (i.e., to the left of the page) and will move, along with the cage 110, in that direction. In this manner, as the power source supplies alternating driving currents of opposite circulations to the coils 112, a periodic Lorentz force will drive, along the x-axis, the cage 110, which includes the coils. An amplitude and a frequency of the displacement $\Delta X$ of the cage 110 along the driving direction depend from the amplitude and the frequency of the alternating driving currents supplied to the coils 112.

The power source can be electrically coupled with the haptic engine 100 through a B2B connector 130. To provide the driving currents to the coils, the primary FPC 120 is electrically connected (1) at one end to the B2B connector 130, and (2) at the opposing end to the secondary FPC 106 through an intermediary FPC 124. FPC 106 has exposed copper pads (not shown in FIG. 1A) to which the coil leads 1121A, 1121B bond. Such a bonding interface can be formed by laser wielding, ultrasonic pressing, conductive glue, solder, etc. As shown in FIGS. 1C-1D, each of the primary FPC 120 and the intermediary FPC 124 includes a flexible plastic substrate 123 and multiple conductive traces 127 distributed over the width of the substrate. In some implementations (not shown in FIGS. 1C-1D), the conductive traces 127 of the primary FPC 120 and the intermediary FPC 124 are suitably embedded in one or more layers over the thickness of the substrate 123. In the examples shown in FIGS. 1C-1D, each of the primary FPC 120 and the intermediary FPC 124 can have at least one segment arranged such that its conductive traces 127 run orthogonally to conductive traces corresponding to its adjacent one or more segments.

Referring again to FIGS. 1A-1B, a portion of the primary FPC 120 is connected to the B2B connector 130 and is affixed external to the housing, e.g., through an external bond 121a. In this example, this portion of the primary FPC 120 is bonded along a surface of the top cover housing 102 parallel to the (x,z)-plane. This surface has a slot 103a parallel to the x-axis. The primary FPC 120 is folded under the top housing cover 102 at a fold 122f, parallel to the slot, and crosses inside the housing through the slot. The fold 122f separates the externally-attached portion from another portion of the primary FPC attached inside the housing. FIG. 1C is an "unfolded" view of the fold 122f, in which "o-t" and "o-b" denote the top edge and the bottom edge, respectively, of the externally-attached portion of the primary FPC 120, and "i-t" and "i-b" denote the top edge and the bottom edge, respectively, of the internally-attached portion of the primary FPC. Moreover, the internally-attached portion of the primary FPC 120 is (1) affixed, e.g., through an internal bond 121i, to the opposing side surface of the top cover housing 102 parallel to the (x,z)-plane, then (2) bent at bend 122b towards a flange 102F parallel to the (y-z)-plane, and (3) affixed to the flange, e.g., through a flange bond 121c. In this example, the flange 102F was formed from the housing base 102B by cutting a flange opening 103b therein. The bonds 121a, 121b, 121c of the primary FPC 120 with the housing material can be formed using adhesive, for instance.

Referring to FIGS. 1A and 1D-1E, the primary FPC 120 includes a suspended portion 120s which extends away from the flange 102F. The suspended portion 120s of the primary FPC 120 is oriented orthogonal to the driving direction, here along the y-axis in the (y,z)-plane. An end of the intermediary FPC 124 is attached to the cage 110 at an interface 107 of the secondary FPC 106, e.g., a coil-port array. The intermediary FPC 124 extends away from the cage 110 and also is oriented orthogonal to the driving direction, here it is suspended along the y-axis in the (y-z) plane. Additionally, the end of the intermediary FPC 124 distal from the interface 107 and the end of the suspended portion 120s of the primary FPC 120 distal from the flange 102F are joined together at a joint 125. The joint 125 is (i) oriented orthogonal to the driving direction, here along the z-axis, and (ii) parallel to the coil 112's wounding axis, here along the z-axis, and (iii) spaced apart from both the cage 110 and the flange 102F. FIGS. 1A and 1E show that the intermediary FPC 124 and the suspended portion 120s of the primary FPC 120, being joined together at the joint 125, form a wishbone-shaped flexure 150, in which (1) the common end of the two wishbone arms is spaced apart from both the cage 110 and the flange 102F, (2) the distal end of one of the wishbone arms is attached to the cage, and (3) the distal end of the other one of the wishbone arms is attached to the flange 102F. Note that this arrangement and orientation of the wishbone-shaped flexure 150 allows the wishbone-shaped flexure to fit inside a compact volume. All the volume enclosing the outer dimensions of the wishbone-shaped flexure 150 is swept by its parts during flexing motion and nothing is wasted. Also note that, because it is made primarily from flexible strips of plastic material), the wishbone-shaped flexure 150 is mechanically soft compared to the metallic blade flexures 109A, 109B, so the wishbone-shaped flexure does not affect the mechanical properties of the haptic engine 100, e.g., the haptic engine's resonant frequency, quality factor, etc. For instance, a stiffness along the x-axis of the wishbone-shaped flexure 150 can be 10×, 100× or 1000× smaller than a stiffness along the x-axis of the metallic blade flexures 109A, 109B.

The intermediary FPC 124 has an electrical connection with the secondary FPC 106 at the interface 107, and another electrical connection with the suspended portion 120s of the primary FPC 120 at the joint 125. These electrical connections of the intermediary FPC 124 can be formed by SMT reflow soldering, conductive adhesive gluing, or laser welding. The multiple conductive traces 127 of the intermediary FPC 124 connected with the secondary FPC 106 at the FPC interface 107, e.g., in one-to-one correspondence with the coil ports of the coil-port array, allows for separate connections to each individual coil 112 for multi-phase driving. In some implementations, not shown in FIGS. 1A-1B, one or more electrical components such as magnetic sensors, capacitors, etc., can be placed on the secondary FPC 106. The electrical connections of such components of the secondary FPC 106 can be routed back through the conductive traces 127 to the primary FPC 120 and the B2B connector 130.

The wishbone-shaped flexure 150—formed by the suspended portion 120s of the primary FPC 120 and the intermediary FPC 124 joined together at the joint 125—is configured so it can comply to motion of the cage 110 relative to the flange 102F to ensure that electrical contact is maintained to the secondary FPC 106 during the motion. Configuration parameters include thickness and/or number of layers of the suspended portion 120s of the primary FPC 120 and/or the intermediary FPC 124; properties of constituent materials of each of the primary FPC 120 and/or the intermediary FPC 124; values of the acute (wishbone) angle between the suspended portion 120s of the primary FPC 120 and the intermediary FPC 124 at the joint 125; and properties of constituent materials of the joint 125. The specifics of the foregoing configuration parameters will vary from design to design depending on the coil resistance, haptic engine's maximum travel, cost, etc. In general, to fabricate a wishbone-shaped flexure 150 having a small stiffness along the x-axis (as noted above), it is desirable to keep the polymer and copper thickness at the suspended portion 120s of the primary FPC 120 and/or the intermediary FPC 124 as thin as manufacturing processes would allow.

Referring to FIG. 1E, when the cage 110 is in motion relative to the flange 102F along the driving direction, (1) the end of the intermediary FPC 124 attached to the cage 110 will be driven along with the cage; (2) points along the intermediary FPC 124 will be induced to move with amplitudes that decrease based on the points' separations from the joint 125; and (3) points along the suspended portion 120s of the primary FPC 120 will be induced to move with amplitudes that decrease based on the points' separations from the flange 102F, such that the end of the suspended portion 120s proximate to the flange 102F will be at rest.

Referring again to FIGS. 1A-1B, the surface of the housing top cover 102 parallel to the (x,z)-plane, onto which the externally-attached portion of the primary FPC 120 is attached, has an aperture 103c. A sensing system 105 of the haptic engine 100 includes Hall-effect sensors 108 mounted on the externally-attached portion of the primary FPC 120 facing the cage 110 through the aperture 103c. The Hall-effect sensors 108' locations are separated from each other, along the x-axis, by a separation of the order of a maximum X travel. The maximum X travel is the maximum distance $2X_0$ that the cage 110 is expected to travel when driven by the driving system 101 between coordinates $\pm X_0$ along the x-axis. Here, a ferritic shield 140 covers the aperture 103c to shield the interior of the housing from electromagnetic noise and magnetic coupling from the environment outside the haptic engine 100.

Additionally, the sensing system 105 includes a sensing magnet 114 affixed to one of the side surfaces of the cage 110 parallel to the (x,z)-plane that faces the Hall-effect sensors through the aperture 103c. The sensing magnet 114 can be held in an enclosure of the cage 110 or in a recess of the side surface of the cage, or can be attached on the cage's side surface itself. In this manner, the sensing magnet 114 produces a sensing magnetic field B oriented along the y-axis, i.e., along a direction that is orthogonal to the driving direction and orthogonal to the direction of the magnetic field $B_Z$ produced by the magnetic plates 104.

Other implementations of the disclosed haptic engine can have the sensing system arranged and configured such that the sensing magnetic field is oriented along a direction parallel to the direction of the magnetic field $B_Z$ produced by the magnetic plates, as described below. In such implementations, the wishbone-shaped flexure will be reoriented relative to the externally-attached portion of the primary FPC, accordingly.

FIG. 2A is a side view, e.g., in the (x,z)-plane of a second example of a haptic engine 200 in which a primary FPC 220 and a secondary FPC 206 are electrically coupled through a wishbone-shaped flexure 250. The haptic engine 200 has a housing formed from a base 202B and a top cover 202. Additionally, the haptic engine 200 includes a driving system 201 and a mass 210 that are enclosed between the housing top cover 202 and housing base 202B. The mass 210 is spaced apart from the housing surfaces and can be driven along a driving direction, in this example the x-axis, as described below.

The driving system 201 includes a stationary part and a moving part and can be implemented and operated as the driving system 101 described in detail in connection with FIGS. 1A-1B. For instance, the mass of the haptic system 200 will again be implemented as a cage 210. The secondary FPC 206 is disposed on the cage 210 and includes conductive traces for carrying corresponding driving currents to individual coils 212. The moving part of the driving system 201 will be carried by the cage 210 when the cage is driven along the driving direction. The stationary part of the driving system 201 includes a pair of magnetic plates affixed to housing surfaces that are parallel to the (x,y)-plane. As such, the cage 210 is sandwiched along the z-axis by the magnetic plates. Although not shown in FIG. 2A, the magnetic plates are implemented in a configuration similar to a Hallbach array, as described above in connection with FIGS. 1A-1B. Each of the magnetic plates produces, inside the cage 210, a magnetic field $B_Z$ oriented along the z-axis, orthogonal to the driving direction. More specifically, for each coil held by the cage 210, the magnetic plates produce a magnetic field $B_Z$ that is parallel to the z-axis over a half of the coil winding, and anti-parallel to the z-axis over the other half of the coil winding. A power source (not shown in FIG. 2A) supplies to the coils 212 driving currents having opposite circulations. In this manner, a periodic Lorentz force will drive, along the x-axis, the cage 210, which includes the coils. An amplitude and a frequency of the displacement ΔX of the cage 210 along the driving direction depend from the amplitude and the frequency of the alternating driving currents supplied to the coils 212.

The power source can be electrically coupled with the haptic engine 200 through a B2B connector 230. To provide the driving currents to the coils, the primary FPC 220 is electrically connected (1) at one end to the B2B connector 230, and (2) at the opposing end to the secondary FPC 206 through an intermediary FPC 224. As shown in FIGS. 2A-2B, each of the primary FPC 220 and the intermediary FPC 124 includes a flexible plastic substrate 223 and multiple conductive traces 227 distributed over the width of the substrate. In some implementations (not shown in FIGS. 2A-2C), the conductive traces 227 of the primary FPC 220 and the intermediary FPC 224 are suitably embedded in one or more layers over the thickness of the substrate 223. In the example shown in FIG. 2B, the primary FPC 220 has a segment arranged such that its conductive traces 227 run orthogonally to conductive traces corresponding to its adjacent segment.

Referring again to FIGS. 2A-2B, a portion of the primary FPC 220 is connected to the B2B connector 230 and is affixed external to the housing, e.g., through an external bond 221a. In this example, this portion of the primary FPC 220 is bonded along the housing base 202B, parallel to the (x,y)-plane. In this example, a flange 202F parallel to the (y-z)-plane was formed from the housing base 202B by cutting a flange opening 203a therein. The noted portion of the primary FPC 220 is bent at bend 222 to follow the flange 202F and crosses inside the housing through the flange opening 203a. A bending axis of the bend 222 is orthogonal to the driving direction, here parallel to the y-axis. Moreover, this portion of the primary FPC 220 is affixed to the flange 202F, e.g., through a flange bond 221b. The bonds 221a, 221b of the primary FPC 220 with the housing material can be formed using adhesive, for instance.

Referring to FIGS. 2A-2C, the primary FPC 220 includes a suspended portion 220s which extends away from the flange 202F. The suspended portion 220s of the primary FPC 220 is oriented orthogonal to the driving direction, here along the y-axis in the (y,z)-plane. An end of the intermediary FPC 224 is attached to the cage 210 at an interface 207 of the secondary FPC 206, e.g., a coil-port array. The connection between the coils 212 and the FPC 206 is similar to what was described for coil leads 1121A, 1121B and FPC 106 in FIG. 1A. The intermediary FPC 224 extends away from the cage 210 and also is oriented orthogonal to the driving direction, here it is suspended along the y-axis in the (y-z) plane. Additionally, the end of the intermediary FPC 224 distal from the interface 207 and the end of the suspended portion 220s of the primary FPC 220 distal from the flange 202F are joined together at a joint 225. Here, the joint 225 is (i) oriented orthogonal to the driving direction, here along the z-axis, and (ii) oriented parallel to a wounding axis of coils 212, and (iii) spaced apart from both the cage 210 and the flange 202F. FIGS. 2A and 2C show that the intermediary FPC 224 and the suspended portion 220s of the primary FPC 220, being joined together at the joint 225, form a wishbone-shaped flexure 250, in which (1) the common end of the two wishbone arms is spaced apart from both the cage 210 and the flange 202F, (2) the distal end of one of the wishbone arms is attached to the cage, and (3) the distal end of the other one of the wishbone arms is attached to the flange 202F. Note that this arrangement and orientation of the wishbone-shaped flexure 250 allows the wishbone-shaped flexure to fit inside a compact volume. All the volume enclosing the outer dimensions the wishbone-shaped flexure 250 is swept by its parts during the flexing motion and nothing is wasted. Also note that, because it is made primarily from flexible strips of plastic material), the wishbone-shaped flexure 250 is mechanically soft (e.g., compared to metallic blade flexures of the haptic engine 200, not shown in FIG. 2A), so the wishbone-shaped flexure 250 does not affect the mechanical properties of the haptic engine 200, e.g., the haptic engine's resonant frequency, quality factor, etc. For instance, a stiffness along the x-axis of the wishbone-shaped flexure 250 can be 10×, 100× or 1000× smaller than a stiffness along the x-axis of the haptic engine 200's metallic blade flexures.

The intermediary FPC 224 has an electrical connection with the secondary FPC 206 at the interface 207, and another electrical connection with the suspended portion 220s of the primary FPC 220 at the joint 225. These electrical connections of the intermediary FPC 224 can be formed by SMT reflow soldering, conductive adhesive gluing, or laser welding. The multiple conductive traces 227 of the intermediary FPC 224 connected with the secondary FPC 206 at the FPC interface 207, e.g., in one-to-one correspondence with the coil ports of the coil-port array, allows for separate connections to each individual coil 212 for multi-phase driving.

The wishbone-shaped flexure 250—formed by the suspended portion 220s of the primary FPC 220 and the intermediary FPC 224 joined together at the joint 225—is configured so it can comply to motion of the cage 210 relative to the flange 202F to ensure that electrical contact is maintained to the secondary FPC 206 during the motion. Configuration parameters include thickness and/or number of layers of the suspended portion 220s of the primary FPC 220 and/or the intermediary FPC 224; properties of constituent materials of each of the primary FPC 220 and/or the intermediary FPC 224; values of the acute (wishbone) angle between the suspended portion 220s of the primary FPC 220 and the intermediary FPC 224 at the joint 225; and properties of constituent materials of the joint 225. The specifics of the foregoing configuration parameters will vary from design to design depending on the coil resistance, haptic engine's maximum travel, cost, etc. In general, to fabricate a wishbone-shaped flexure 250 having a small stiffness along the x-axis (as noted above), it is desirable to keep the polymer and copper thickness at the suspended portion 220s of the primary FPC 220 and/or the intermediary FPC 224 as thin as manufacturing processes would allow.

Referring to FIG. 2C, when the cage 210 is in motion relative to the flange 202F, along the driving direction, (1) the end of the intermediary FPC 224 attached to the cage 210 will be driven along with the cage; (2) points along the intermediary FPC 224 will be induced to move with amplitudes that decrease based on the points' separations from the joint 225; and (3) points along the suspended portion 220s of the primary FPC 220 will be induced to move with amplitudes that decrease based on the points' separations from the flange 202F, such that the end of the suspended portion 220s proximate to the flange 202F will be at rest.

Referring again to FIG. 2A, the housing base 202B parallel to the (x,y)-plane, onto which the externally-attached portion of the primary FPC 220 is attached, has an aperture 203b. A sensing system 205 of the haptic engine 200 includes Hall-effect sensors 208 mounted on the externally-attached portion of the primary FPC 220 facing the cage 210 through the aperture 203b. The Hall-effect sensors 208' locations are separated from each other, along the x-axis, by a separation of the order of a maximum X travel. The maximum X travel is the maximum distance $2X_0$ that the cage 210 is expected to travel when driven by the driving system 201 between coordinates $\pm X_0$ along the x-axis. Here, a ferritic shield 240 covers the aperture 203b to shield the interior of the housing from electromagnetic noise and magnetic coupling from the environment outside the haptic engine 200.

Additionally, the sensing system 205 includes a sensing magnet 214 affixed to a base of the cage 210 parallel to the (x,y)-plane that faces the Hall-effect sensors through the aperture 203b. The sensing magnet 214 can be held in an enclosure of the cage 210 or in a recess of the base of the cage, or can be attached on the cage's base surface itself. In this manner, the sensing magnet 214 produces a sensing magnetic field B oriented along the z-axis, i.e., along a direction that is orthogonal to the driving direction and parallel to the direction of the magnetic field $B_Z$ produced by the magnetic plates.

Either of the implementations 100, 200 of the disclosed haptic engine can be used to sense displacements of the cage 110, 210 in the X, Y and Z directions and detect the cage's tilt Φ, in the following manner. As the cage 110, 210 is being driven by the driving system 101, 201 along the x-axis, the Hall-effect sensors 108, 208 will sense changes in the sensing magnetic field B(X) produced by the sensing magnet 114, 214 as the sensing magnet is being carried by the cage. Hall voltage signals, which are output by the Hall-effect sensors 108, 208 in response to the changes in the sensing magnetic field B(X), are provided by the haptic engine 100, 200—through conducting traces of the primary FPC 120, 220 and the B2B connector 130, 230—to a digital processor (e.g., see 670 or 704) to determine the displacement ΔX of the cage 110, 210. In some implementations, the Hall voltage signals can be used to detect the cage 110, 210's unwanted displacements ΔZ, ΔY and tilt ΔΦ. The latter modes are sensed on the common mode signal between the Hall-effect sensors 108, 208, while the ΔX is sensed on the differential mode. The ΔZ, ΔY, ΔΦ modes' frequency range is also typically designed to be higher than the fundamental ΔX mode, so the former modes' signals can be further separated from the latter mode's signal by band-pass filtering.

Figure 8:
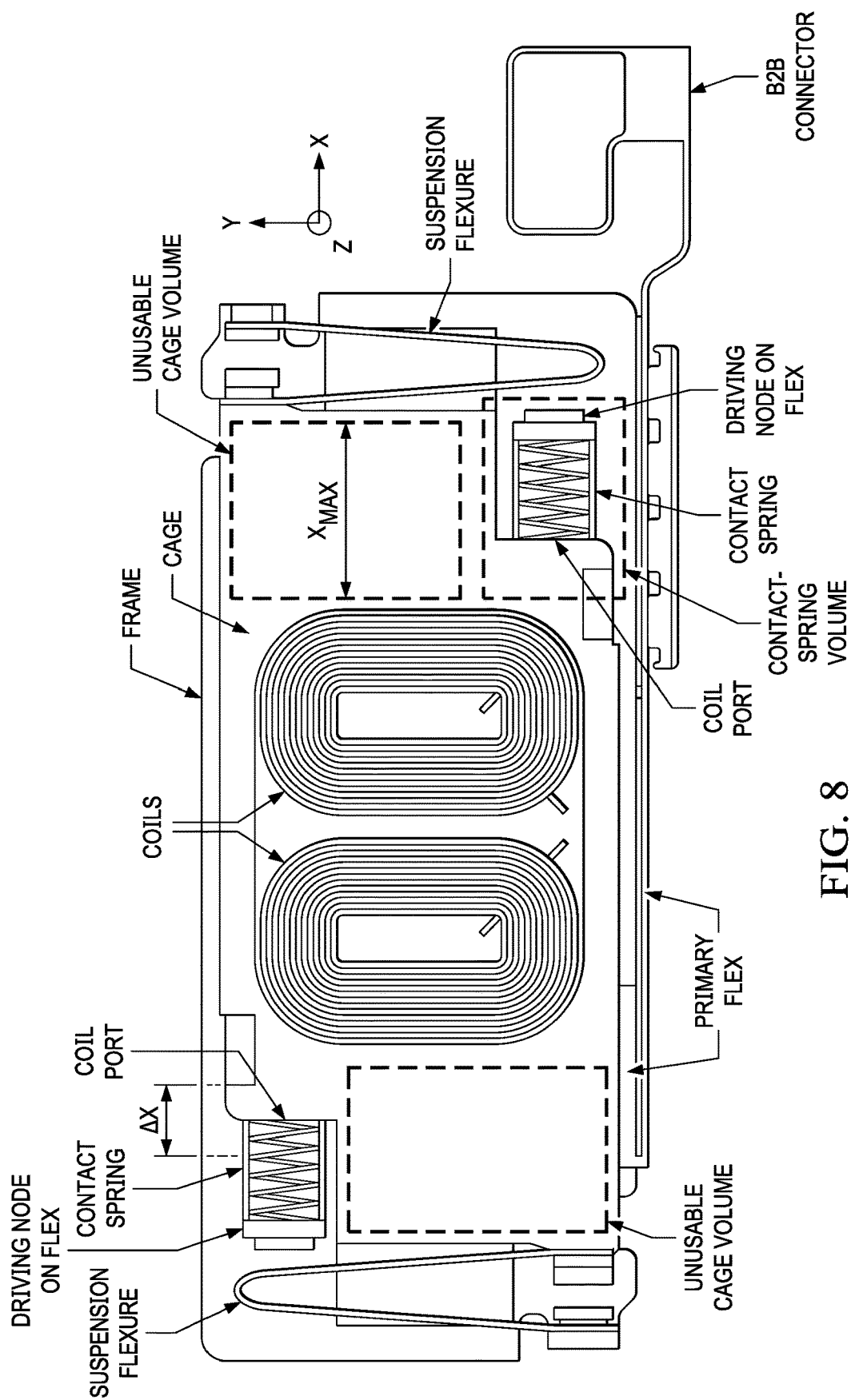
FIG. 8 shows aspects of a conventional haptic engine.

Note that either of the implementations 100, 200 of the disclosed haptic engine makes more efficient use of cage volume compared to the conventional haptic engine illustrated in FIG. 8. The previously unused cage volume (adjacent to the two cutout diagonal corners of the cage of the conventional haptic engine) is now used to accommodate larger, or more than two, coils 112, 212. Moreover, either of the implementations 100, 200 of the disclosed haptic engine allows for the top cover 102, 202 to be dropped in after everything is assembled onto the base cover 102B, 202B. This feature allows for easy inspection and improves manufacturability.

Figure 3A:
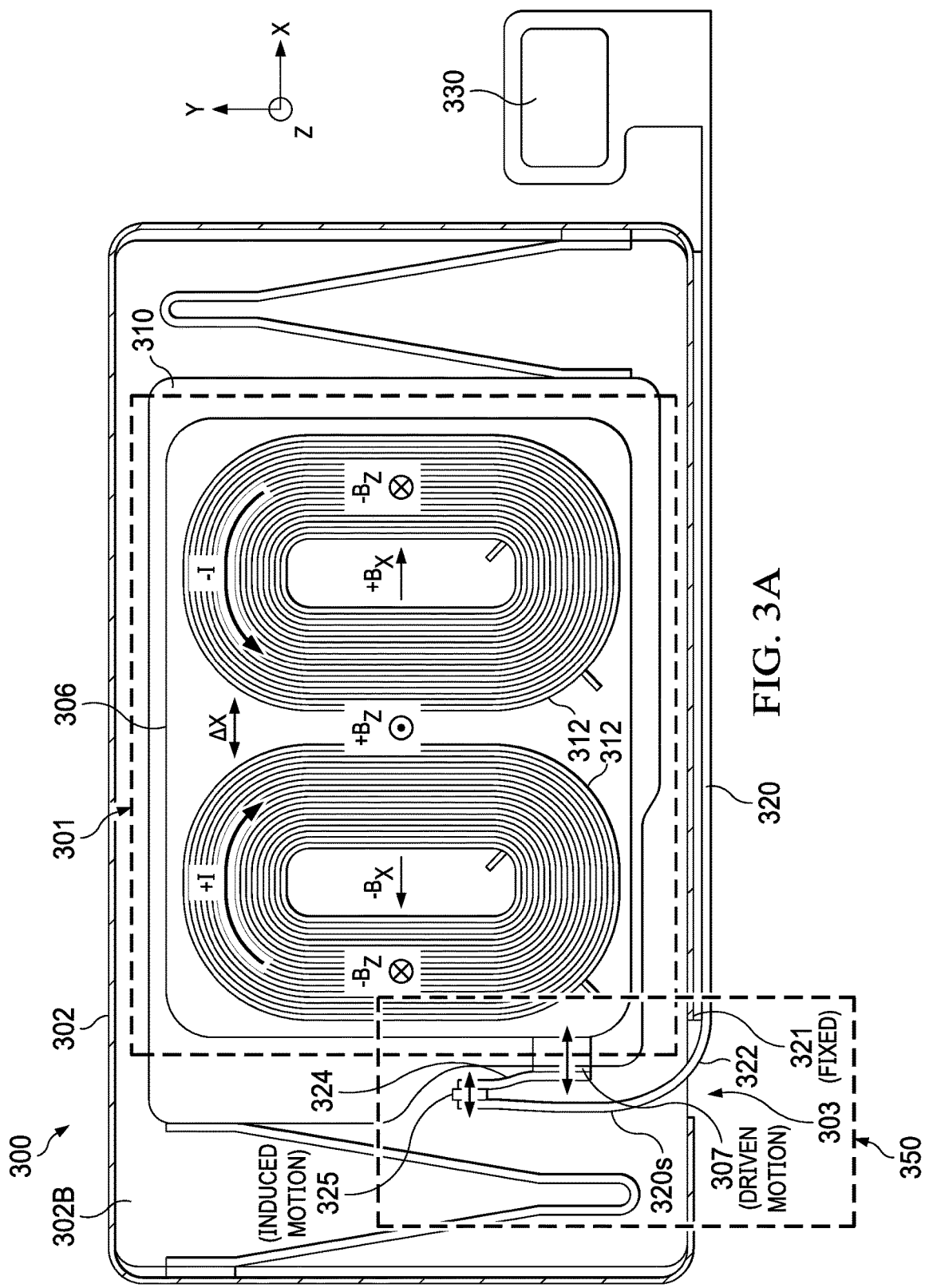
FIGS. 3A-3C show aspects of a third example of a haptic engine.

FIG. 3A is a plan view, e.g., in the (x,z)-plane, of a another example of a haptic engine 300 in which a primary FPC 320 and a secondary FPC 306 are electrically coupled through a modified wishbone-shaped flexure 350. The haptic engine 300 has a housing formed from a base 302B and a top cover 302. Additionally, the haptic engine 300 includes a driving system 301 and a mass 310 that are enclosed between the housing top cover 302 and housing base 302B. The mass 310 is spaced apart from the housing surfaces and can be driven along a driving direction, in this example the x-axis, as described below.

The driving system 301 includes a stationary part and a moving part and can be implemented and operated as the driving system 101 described in detail in connection with FIGS. 1A-1B. For instance, the mass of the haptic system 300 will again be implemented as a cage 310. The secondary FPC 306 is disposed on the cage 310 and includes conductive traces for carrying corresponding driving currents to individual coils 312. The connection between the coils 312 and the FPC 306 is similar to what was described for coil leads 1121A, 1121B and FPC 106 in FIG. 1A. The moving part of the driving system 301 will be carried by the cage 310 when the cage is driven along the driving direction. The stationary part of the driving system 301 includes a pair of magnetic plates affixed to housing surfaces that are parallel to the (x,y)-plane. As such, the cage 310 is sandwiched along the z-axis by the magnetic plates. Although not shown in FIG. 3A, the magnetic plates are implemented in a configuration similar to a Hallbach array, as described above in connection with FIGS. 1A-1B. Each of the magnetic plates produces, inside the cage 310, a magnetic field $B_z$ oriented along the z-axis, orthogonal to the driving direction. More specifically, for each coil held by the cage 310, the magnetic plates produce the magnetic field $B_z$ that is parallel to the z-axis over a half of the coil winding, and anti-parallel to the z-axis over the other half of the coil winding. A power source (not shown in FIG. 3A) supplies to the coils 312 driving currents having opposite circulations. In this manner, a periodic Lorentz force will drive, along the x-axis, the cage 310, which includes the coils. An amplitude and a frequency of the displacement $\Delta X$ of the cage 310 along the driving direction depend from the amplitude and the frequency of the alternating driving currents supplied to the coils 312.

Figure 3B:
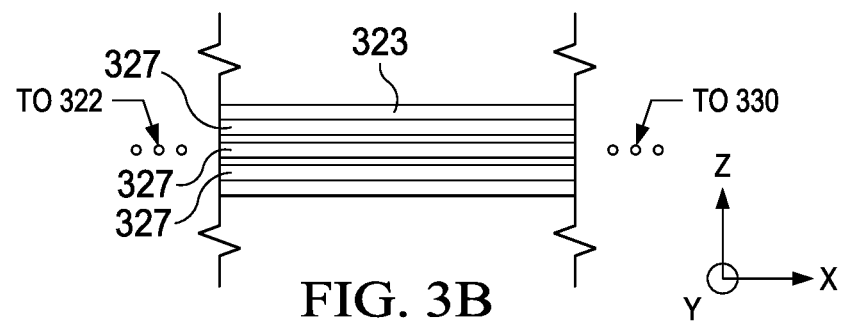
Figure 3C:
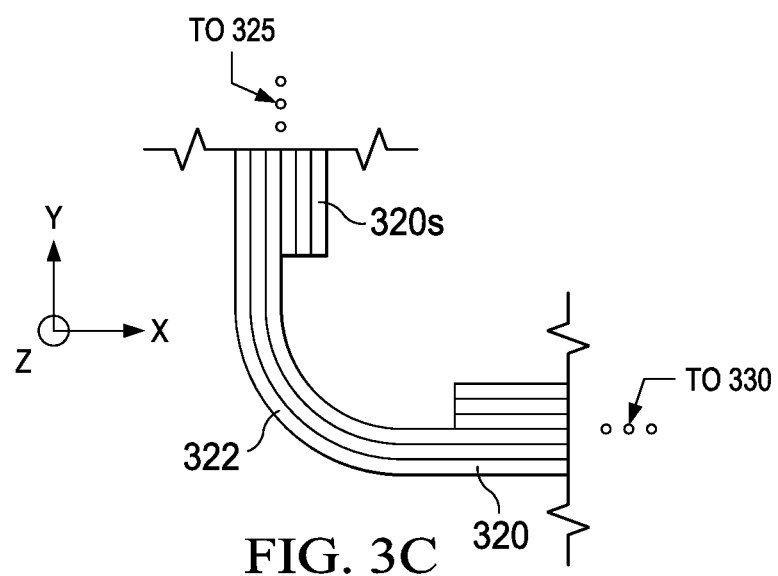

The power source can be electrically coupled with the haptic engine 300 through a B2B connector 330. To provide the driving currents to the coils, the primary FPC 320 is electrically connected (1) at one end to the B2B connector 330, and (2) at the opposing end to the secondary FPC 306 through an intermediary FPC 324. As shown in FIGS. 3A-3B, each of the primary FPC 320 and the intermediary FPC 324 includes a flexible plastic substrate 323 and multiple conductive traces 327 distributed over the width of the substrate. FIG. 3C shows that the conductive traces 327 of the primary FPC 320 (and in some cases of the intermediary FPC 324) are suitably embedded in multiple layers over the thickness of the substrate 323.

Referring again to FIG. 3A, a portion of the primary FPC 320 is connected to the B2B connector 330 and is affixed external to the housing, e.g., through an external bond 321. The bond 321 of the primary FPC 320 with the housing material can be formed using adhesive, for instance. In this example, the externally-attached portion of the primary FPC 320 is bonded along a surface of the top cover housing 302 parallel to the (x,z)-plane. This surface has a slot 303 parallel to the z-axis.

The primary FPC 320 includes a suspended portion 320s which is bent at bend 322 and crosses inside the housing through the slot 303. Here, a bending axis of the bend 322 is orthogonal to the driving direction, here parallel to the z-axis. Beyond the bend 322, the suspended portion 320s of the primary FPC 320 extends oriented orthogonal to the driving direction, here along the y-axis in the (y,z)-plane. An end of the intermediary flex 324 is attached to the cage 310 at an interface 307 of secondary flex 306, e.g., a coil-port array. The intermediary flex 324 extends away from the cage 310 and is oriented orthogonal to the driving direction, here it is suspended along the y-axis in the (y-z) plane. Additionally, the end of the intermediary flex 324 distal from the interface 307 and the unbent end of the suspended portion 320s of the primary FPC 320 (i.e., the end of the suspended portion 320s distal from the bend 322) are joined together at a joint 325. Here, the joint 325 is (i) oriented orthogonal to the driving direction, here along the z-axis, and (ii) parallel to a wounding axis of the coils 312, and (iii) spaced apart from both the cage 310 and the housing 302/302B. In this manner, the intermediary flex 324 and the suspended portion 320s of the primary FPC 320, being joined together at the joint 325, form a modified wishbone-shaped flexure 350, in which the common end of the two wishbone arms is spaced apart from both the cage 310 and the housing 302/302B, the distal end of one of the wishbone arms is attached to the cage, and the distal end of the other one of the wishbone arms is bent and attached to the top cover housing 302 adjacent to the slot 303. Note that this arrangement and orientation of the wishbone-shaped flexure 350 allows the wishbone-shaped flexure to fit inside a compact volume. All the volume enclosing the outer dimensions of the wishbone-shaped flexure 350 is swept its parts during flexing motion and nothing is wasted. Also note that, because it is made primarily from flexible strips of plastic material), the modified wishbone-shaped flexure 350 is mechanically soft compared to the metallic blade flexures of the haptic engine 300, so the modified wishbone-shaped flexure does not affect the mechanical properties of the haptic engine 300, e.g., the haptic engine's resonant frequency, quality factor, etc. For instance, a stiffness along the x-axis of the wishbone-shaped flexure 350 can be 10×, 100× or 1000× smaller than a stiffness along the x-axis of the haptic engine 300's metallic blade flexures.

The intermediary FPC 324 has an electrical connection with the secondary FPC 306 at the interface 307, and another electrical connection with the suspended portion 320s of the primary FPC 320 at the joint 325. These electrical connections of the intermediary FPC 324 can be formed by SMT reflow soldering, conductive adhesive gluing, or laser welding. The multiple conductive traces 327 of the intermediary FPC 324 connected with the secondary FPC 306 at the FPC interface 307, e.g., in one-to-one correspondence with the coil ports of the coil-port array, allows for separate connections to each individual coil 312 for multi-phase driving.

The modified wishbone-shaped flexure 350—formed by the suspended portion 320s of the primary FPC 320 and the intermediary FPC 324 joined together at the joint 325, the former having a bend 322 distal from the joint—is configured so it can comply to motion of the cage 310 relative to the top cover housing 302, to ensure that electrical contact is maintained to the secondary FPC 306 during the motion. Configuration parameters include values of the bend 322's radius of curvature, and thickness and/or number of layers in the bend region of the suspended portion 320s of the primary FPC 320. Additional configuration parameters can include thickness and/or number of layers of the intermediary FPC 324; properties of constituent materials of each of the primary FPC 320 and/or the intermediary FPC 324; values of the acute (wishbone) angle between the suspended portion 320s of the primary FPC 320 and the intermediary FPC 324 at the joint 325; and properties of constituent materials of the joint 325. The specifics of the foregoing configuration parameters will vary from design to design depending on the coil resistance, haptic engine's maximum travel, cost, etc. In general, to fabricate a modified wishbone-shaped flexure 350 having a small stiffness along the x-axis (as noted above), it is desirable to keep the polymer and copper thickness at the suspended portion 320s of the primary FPC 320 and/or the intermediary FPC 324 as thin as manufacturing processes would allow.

In the example illustrated in FIG. 3C, to achieve a desired stiffness of the modified wishbone-shaped flexure 350, the suspended portion 320s of the primary FPC 320 has smaller thickness, e.g., fewer layers of FPC material, in the bend region compared to the region extending along the (y,z)-plane from the bend 322 toward the joint 325. By having a recess in the bend region as shown in FIG. 3C, bending stress of the suspended portion 320s of the primary FPC 320 can be minimized.

Referring again to FIG. 3A, when the cage 310 is in motion relative to the housing 302/302B along the driving direction, (1) the end of the intermediary FPC 324 attached to the cage 310 will be driven along with the cage; (2) points along the intermediary FPC 324 will be induced to move with amplitudes that decrease based on the points' separations from the joint 325; (3) points along the suspended portion 320s of the primary FPC 320 will be induced to move with amplitudes that decrease based on the points' separations from the housing measured along the bend 322, here from the top cover housing 302 adjacent to the slot 303, and (4) the bent end of the suspended portion 320s bonded to the top cover housing 302 adjacent to the slot 303 will be at rest.

Although not explicitly shown in FIG. 3, a sensing system of the haptic engine 300 can be arranged and configured as the sensing system 105 described above in connection with FIG. 1A. Here, Hall-effect sensors are disposed on the portion of the primary FPC 320 attached to the surface of the top cover housing 302 parallel to the (x,z)-plane, and a sensing magnet is disposed on a surface of the cage 310 parallel to the (x,z)-plane that faces the Hall-effect sensors to produce a sensing magnetic field along the y-axis, i.e., along a direction that is orthogonal to both the driving direction and the direction of the magnetic field $B_Z$ produced by the magnetic plates. As the cage 310 is being driven by the driving system 301 along the x-axis, the sensing system of the haptic engine 300 can be operated to sense displacements of the cage in the X, Y and Z directions and detect the cage's tilt 1, as described above in connection with the sensing system 105.

Note that a dimension along the driving direction, here the x-axis, of each of the wishbone-shaped flexure 150, 250 and the modified wishbone-shaped flexure 350 used by the haptic engines 100, 200, 300 is smaller than the cumulative length of the contact springs used by the conventional haptic engine illustrated in FIG. 8. By using the wishbone-shaped flexure 150, 250 or the modified wishbone-shaped flexure 350, more volume is available on the cage 110, 210 or 310 for the pair of coils 112, 212 or 312 compared to the volume available on the cage of the conventional haptic engine illustrated in FIG. 8. As such, larger coils 112, 212 or 312 can be encapsulated into the cage 110, 210 or 310 compared to the coils encapsulated into a cage of the conventional haptic engine illustrated in FIG. 8. Moreover, more than two coils can be encapsulated into a cage if the dimension along the driving direction of the disclosed flexures can be further decreased, as described next.

Figure 4:
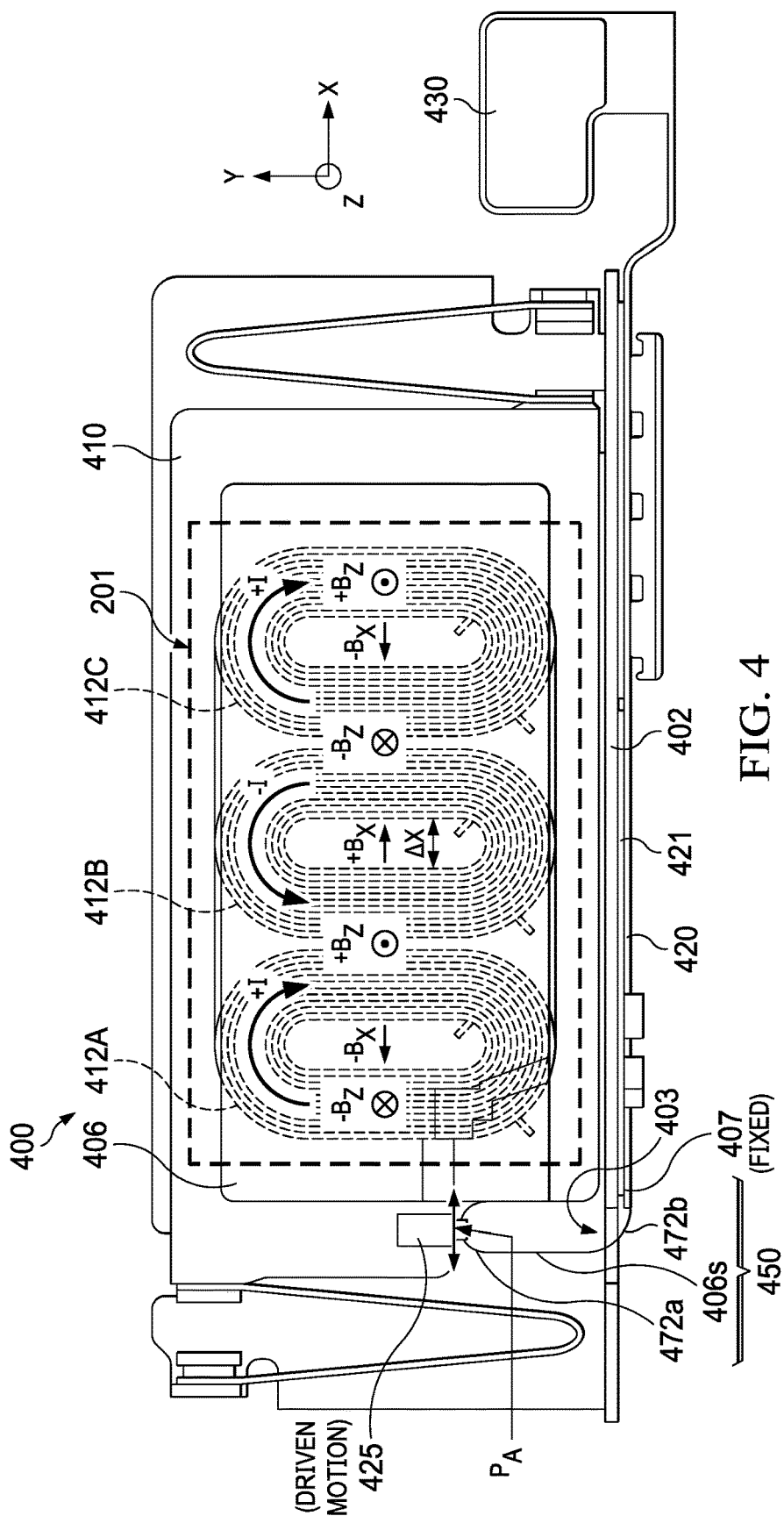
FIG. 4 shows a fourth example of a haptic engine.

FIG. 4 is a plan view, e.g., in the (x,z)-plane, of a another example of a haptic engine 400 in which a primary FPC 420 and a secondary FPC 406 are electrically coupled through a bent-leaf flexure 450. The haptic engine 400 has a housing 402, and includes a driving system 401 and a mass 410 that are enclosed inside the housing. The mass 410 is spaced apart from the housing surfaces and can be driven along a driving direction, in this example the x-axis, as described below.

The driving system 401 includes a stationary part and a moving part. In the example illustrated in FIG. 4, the moving part includes multiple coils, here three coils 412A, 412B, 412C, each of which being formed from a winding parallel to the (x,y)-plane. While accounting for the larger number of coils, the moving part of the driving system 401 can be implemented and operated as the driving system 101 described in detail in connection with FIGS. 1A-1B. For instance, the mass of the haptic system 400 will again be implemented as a cage 410.

In the example illustrated in FIG. 4, a portion of the secondary FPC 406 is disposed on, and attached to, the cage 410 and includes conductive traces for carrying corresponding driving currents to individual coils 412A, 412B, 412C. The connection between the coils 412A, 412B, 412C and the FPC 406 is similar to what was described for coil leads 1121A, 1121B and FPC 106 in FIG. 1A. The moving part of the driving system 401 will be carried by the cage 410 when the cage is driven along the driving direction. The stationary part of the driving system 401 includes a pair of magnetic plates (not shown in FIG. 4A) affixed to housing surfaces that are parallel to the (x,y)-plane. As such, the cage 410 is sandwiched along the z-axis by the magnetic plates. Although not shown in FIG. 4, the magnetic plates are implemented in a configuration similar to a Hallbach array, as described above in connection with FIGS. 1A-1B. Each of the magnetic plates produces, inside the cage 410, a magnetic field $B_Z$ oriented along the z-axis, orthogonal to the driving direction. More specifically, for each coil held by the cage 410, the magnetic plates produce the magnetic field $B_Z$ that is parallel to the z-axis over a half of the coil winding, and anti-parallel to the z-axis over the other half of the coil winding. A power source (not shown in FIG. 4A) supplies to the coils 412A, 412B, 412C driving currents having opposite circulations. In this manner, a periodic Lorentz force will drive, along the x-axis, the cage 410, which includes the coils. An amplitude and a frequency of the displacement $\Delta X$ of the cage 410 along the driving direction depend from the amplitude and the frequency of the alternating driving currents supplied to the coils 412A, 412B, 412C.

The power source can be electrically coupled with the haptic engine 400 through a B2B connector 430. To provide the driving currents to the coils, the primary FPC 420 is electrically connected (1) at one end to the B2B connector 430, and (2) at the opposing end to the secondary FPC 406. As was the case with the primary FPC 120, 220, 320 of the implementations of haptic engine 100, 200, 300 described above, the primary FPC 420 includes a flexible plastic substrate and multiple conductive traces distributed over the width of the substrate. In some implementations, the conductive traces of the primary FPC 420 are suitably embedded in multiple layers over the thickness of the substrate.

The primary FPC 420 is connected to the B2B connector 430 and is affixed external to the housing 402, e.g., through an external bond 421. The bond 421 of the primary FPC 420 with the housing material can be formed using adhesive, for instance. In this example, the externally-attached primary FPC 420 is bonded along a surface of the housing 402 parallel to the (x,z)-plane. This surface can have a slot 403 parallel to the z-axis.

The secondary FPC 406 includes a suspended portion 406s which extends towards the interior of the housing 402 from the main portion of the secondary FPC which is attached to the cage 410. As was the case with the suspended portion of the primary FPC 120s, 220s, 320s of the implementations of haptic engine 100, 200, 300 described above, the suspended portion 406s of the secondary FPC 406 includes a flexible plastic substrate and multiple conductive traces distributed over the width of the substrate. In some implementations, the conductive traces of the suspended portion 406s of the secondary FPC 406 are suitably embedded in multiple layers over the thickness of the substrate. Here, the suspended portion 406s of the secondary FPC 406 bends away from the portion of the secondary FPC attached to the cage 410 at a first bend 472a, extends—oriented orthogonal to the driving direction, here along the y-axis in the (y,z)-plane—toward a surface of the housing 402 parallel to the (x,z)-plane, and bends toward the housing surface at a second bend 472b. A first bending axis of the first bend 472a and a second bending axis of the second bend 472b are (i) parallel to each other, and (ii) parallel to a wounding axis of the coils 412A, 412B, 412C, and (iii) orthogonal to the driving direction. Also, when the primary FPC 420 is bonded externally to the surface of the housing 402 parallel to the (x,z)-plane, as shown in FIG. 4, the suspended portion 406s of the secondary FPC 406 crosses outside the housing through the slot 403.

In this manner, the suspended portion 406s of the secondary FPC 406 forms a bent-leaf flexure 450, in which one end of the leaf is bent and attached to the cage 410, here through the fastener 425, and the other end of the leaf is bent and attached to the primary FPC 420 adjacent to the slot 403 on the surface of the housing 402 parallel to the (x,z)-plane. Note that this arrangement and orientation of the bent-leaf flexure 450 allows the bent-leaf flexure to fit inside a compact volume. All the volume enclosing the outer dimensions of the bent-leaf flexure 450 is swept by its parts during the flexing motion and nothing is wasted. Also note that, because it is made primarily from flexible strips of plastic material, the bent-leaf flexure 450 is mechanically soft compared to the metallic blade flexures of the haptic engine 400, so the bent-leaf flexure does not affect the mechanical properties of the haptic engine 400, e.g., the haptic engine's resonant frequency, quality factor, etc. For instance, a stiffness along the x-axis of the bent-leaf flexure 450 can be 10×, 100× or 1000× smaller than a stiffness along the x-axis of the haptic engine 400's metallic blade flexures.

The suspended portion 406s of the secondary FPC 406 has an electrical connection with the primary FPC 420 at an interface 407, e.g., a coil-port array. This electrical connection of the suspended portion 406s of the secondary FPC 406 at the interface 407 can be formed by SMT reflow soldering, hot-bar soldering, conductive adhesive gluing, or laser welding. The multiple conductive traces of the suspended portion 420s of the secondary FPC 406 connected with the primary FPC 420 at the FPC interface 421, e.g., in one-to-one correspondence with the coil ports of the coil-port array, allows for separate connections to each individual coil 412A, 412B, 412C for multi-phase driving.

Note that a fastener 425 disposed on the cage 410 locks the suspended portion 406s of the secondary FPC 406 to the cage 410 at a point $P_A$ that is part of the first bend 472a. By fixing the point $P_A$ of the suspended portion 406s to the cage 410, the fastener 425 ensures that points of the suspended portion 406s between point $P_A$ and the main portion of the secondary FPC 406 attached to the cage 410 are stationary relative to the cage 410, such that only points of the suspended portion 406s extending beyond the fixed point $P_A$ can move relative to the cage 410. In this manner, the fastener 425 provides, during motion of the cage relative to the housing, stress relief to the first bend 472a. In some implementations, the fastener 425 can be implemented as a clamp that is either glued or welded to the cage 410. The fastener 425 fixes the point $P_A$ of the suspended portion 406s of the secondary FPC 406 to the cage 410 by either swaging and/or using adhesive.

The bent-leaf flexure 450—formed from the suspended portion 406s of the secondary FPC 406 having a first bend 472a at the fastener 425 (through which the suspended portion 406s is attached to the cage 410) and a second bend 472b distal from the fastener 425—is configured so it can comply to motion of the cage relative to the housing 402 to ensure that electrical contact is maintained to the primary FPC 420 during the motion. Configuration parameters include values of radii of curvature of the first and second bends 472a, 472b, and thickness and/or number of layers in the bend regions of the suspended portion 406s of the secondary FPC 406; and a value of the length of the suspended portion 406s of the secondary FPC 406 between the first and second bends 472a, 472b. For instance, in some implementations, each of the first and second bends 472a, 472b can be implemented as the thinned-down bend 322 illustrated in FIG. 3C. Additional configuration parameters can include properties of constituent materials of the secondary FPC 406; a type of the fastener 425; and properties of constituent materials of the fastener 425. The specifics of the foregoing configuration parameters will vary from design to design depending on the coil resistance, haptic engine's maximum travel, cost, etc. In general, to fabricate a bent-leaf flexure 450 having a small stiffness along the x-axis (as noted above), it is desirable to keep the polymer and copper thickness at the suspended portion 406s of the secondary FPC 406 as thin as manufacturing processes would allow.

When the cage 410 is in motion relative to the housing 402 along the driving direction, (1) the fixed point $P_A$—of the first bend 472a of the suspended portion 406s of the secondary FPC 406—attached to the cage 410 will be driven along with the cage, (2) points along the suspended portion 406s of the secondary FPC 406 will be induced to move with amplitudes that decrease based on the points' separations from the housing 402 measured along the first and second bends 472a, 472b, and (3) the second bent end of the suspended portion 406s attached to the housing 402 adjacent to the slot 403 at interface 421 will be at rest.

Although not explicitly shown in FIG. 4, a sensing system of the haptic engine 400 can be arranged and configured as the sensing system 105 described above in connection with FIG. 1A. Here, Hall-effect sensors are disposed on the portion of the primary FPC 420 attached to the surface of the housing 402 parallel to the (x,z)-plane, and a sensing magnet is disposed on a surface of the cage 410 parallel to the (x,z)-plane that faces the Hall-effect sensors to produce a sensing magnetic field along the y-axis, i.e., along a direction that is orthogonal to both the driving direction and the direction of the magnetic field $B_Z$ produced by the magnetic plates. As the cage 410 is being driven by the driving system 401 along the x-axis, the sensing system of the haptic engine 400 can be operated to sense displacements of the cage in the X, Y and Z directions and detect the cage's tilt Φ, as described above in connection with the sensing system 105.

Either of the implementations 300, 400 of the disclosed haptic engine can be used to sense displacements of the cage 310, 410 in the X, Y and Z directions and detect the cage's tilt Φ, in the following manner. As the cage 310, 410 is being driven by the driving system 301, 401 along the x-axis, the Hall-effect sensors will sense changes in the sensing magnetic field B(X) produced by the sensing magnet as the sensing magnet is being carried by the cage. Hall voltage signals, which are output by the Hall-effect sensors in response to the changes in the sensing magnetic field B(X), are provided by the haptic engine 300, 400—through conducting traces of the primary FPC 320, 420, and the B2B connector 330, 430—to a digital processor (e.g., 670, 704) to determine the displacement ΔX of the cage 310, 410. In some implementations, the Hall voltage signals can be used to detect the cage 310, 410's unwanted displacements $\Delta Z$, $\Delta Y$ and tilt $\Delta \Phi$. The latter modes are sensed on the common mode signal between the Hall-effect sensors, while the $\Delta X$ is sensed on the differential mode. The $\Delta Z$, $\Delta Y$, $\Delta \Phi$ modes' frequency range is also typically designed to be higher than the fundamental $\Delta X$ mode, so the former modes' signals can be further separated from the latter mode's signal by band-pass filtering.

Referring now to any of the implementations of the haptic engine 100, 200, 300, 400, note that use of a flexure 150, 250, 350, 450 to provide driving currents to the secondary FPC 106, 206, 306, 406, as described above, ensures that the weight of the cage 110, 210, 310, 410 is balanced along the driving direction better than the weight of the cage of the conventional haptic engine illustrated in FIG. 8. In the conventional case, portions of the cage were removed from two diagonally opposed corners thereof, the removed portions sized such that the carved corners can accommodate respective contact springs. As such, the "no-longer rectangular" cage of the conventional haptic engine illustrated in FIG. 8 lost its mirror symmetry relative a symmetry axis parallel to the driving direction because it has two diagonally opposed corners that are missing. As such, depending of the size of the contact springs, the corner openings of the cage can have a length, along the driving direction, and a width, along the transverse direction, that could significantly unbalance the cage of the conventional haptic engine along the driving direction. In contrast, corners of the cage 110, 210, 310, 410 need not be removed, as they were removed for the conventional case, to accommodate the flexure 150, 250, 350, 450. Thus, the shape of the cage 110, 210, 310, 410 is substantially rectangular, i.e., it has mirror symmetry relative a symmetry axis parallel to the driving direction.

Also for all the implementations the haptic engine 100, 200, 300, 400 described above, coil strands oriented along the driving direction, here the x-axis, do not contribute to the Lorentz forces which move the cage 110, 210, 310, 410 of the haptic engine along the driving direction. The coil strands oriented in this manner correspond to "inactive" portions of the coils 112, 212, 312, 412 adjacent to the edges of the cage 510 that are parallel to the driving direction. Therefore, the magnetic plates (e.g., 104) affixed to the housing 102/102B, 202/202B, 302/302B, 402 need not overlap the inactive portions of the coils 110, 210, 310, 410 at the noted periphery of the cage 110, 210, 310, 410. As such, a width of the magnetic plates (e.g., 104) along the transverse direction, here along the y-axis, can be reduced. This could free space to attach additional mass to the moving cage, as described next.

Figure 5A:
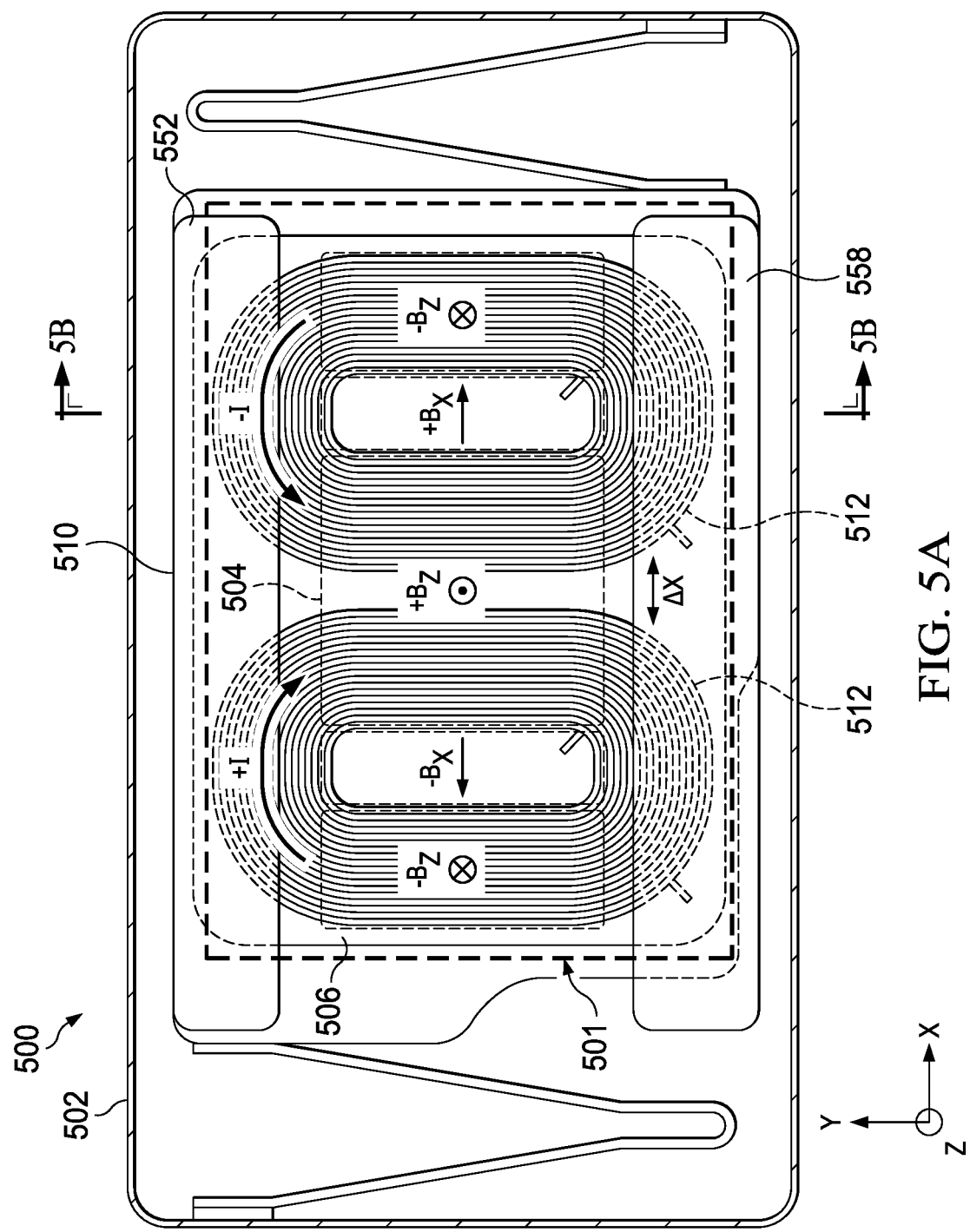
FIGS. 5A-5B show aspects of a modification of the disclosed haptic engines.
Figure 5B:
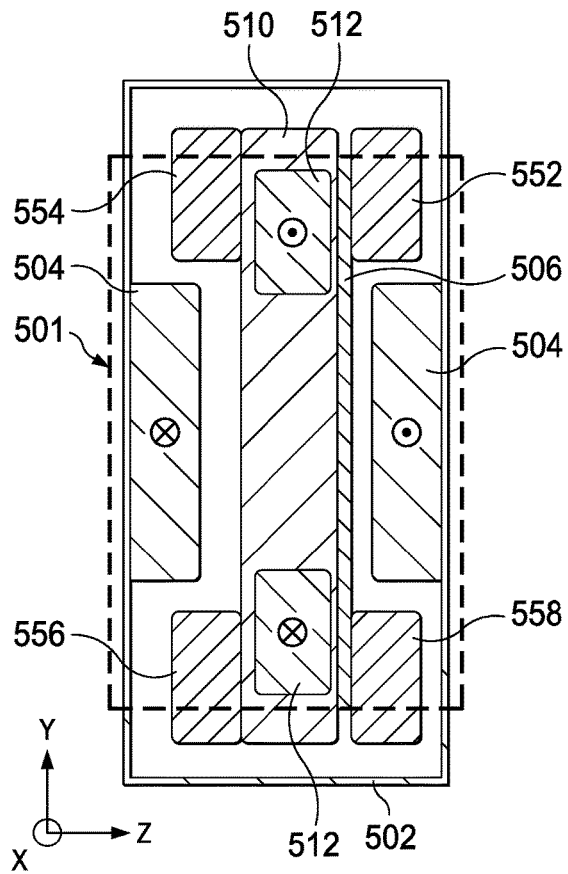

FIG. 5A is a plan view, e.g., in the (x,y)-plane, and FIG. 5B is a cross-section view, in the (y,z)-plane, of a haptic engine 500 corresponding to a modification of the haptic engine 100, 200 or 300. Note that the haptic engine 400 also can be modified in a manner similar to the one described below. Like the above-noted haptic engines, the haptic engine 500 has a housing 502, and includes a driving system 501 and a mass—implemented as a cage 510—that are enclosed inside the housing. The cage 510 is spaced apart from the housing surfaces and can be driven along a driving direction, in this example the x-axis. The modification includes adding mass to the cage 510 along the driving direction by using a mass arrangement that is mirror-symmetric relative to a symmetry axis of the cage parallel to the driving direction. If weight were added to the cage of a conventional haptic engine (e.g., like the one illustrated in FIG. 8) along a driving direction, then a mass arrangement that is not mirror-symmetric relative the driving direction would be used.

In the example illustrated in FIGS. 5A-5B, the driving system 501 includes a stationary part and a moving part. The moving part includes multiple coils 512, each of which being formed from a winding parallel to the (x,y)-plane. A secondary FPC 506 is disposed on the cage 510 and includes conductive traces for carrying corresponding driving currents to individual coils 512. The moving part of the driving system 501 will be carried by the cage 510 when the cage is driven along the driving direction. The stationary part of the driving system 501 includes a pair of magnetic plates 504 affixed to housing surfaces that are parallel to the (x,y)-plane. As such, the cage 510 is sandwiched along the z-axis by the magnetic plates 504. The magnetic plates 504 are implemented in a configuration similar to a Hallbach array, as described above in connection with FIGS. 1A-1B. Each of the magnetic plates 504 produces, inside the cage 510, a magnetic field $B_Z$ oriented along the z-axis, orthogonal to the driving direction. More specifically, for each coil held by the cage 510, the magnetic plates 504 produce the magnetic field $B_Z$ that is parallel to the z-axis over a half of the coil winding, and anti-parallel to the z-axis over the other half of the coil winding. A power source (not shown in FIGS. 5A-5B) supplies to the coils 512 driving currents having opposite circulations. In this manner, a periodic Lorentz force will drive, along the x-axis, the cage 510, which includes the coils 512. An amplitude and a frequency of the displacement $\Delta X$ of the cage 510 along the driving direction depend from the amplitude and the frequency of the alternating driving currents supplied to the coils 512.

In the example illustrated in FIGS. 5A-5B, mass blocks 552, 554, 556, 558 are added to the cage 510, each of the mass blocks extending along the driving direction, here along the x-axis. A first pair of mass blocks 552 and 558 is attached to one of the surfaces of the cage 510 parallel to the (x,y)-plane over the inactive portions of the coils 512. As the coils 512 are inactive over coil strands parallel to the direction of motion, the mass blocks 552 and 558 are disposed at the periphery of the cage 510 adjacent to respective cage edges that are parallel to the direction of motion. Similarly, a second pair of mass blocks 554 and 556 is attached to the opposing one of the cage surfaces parallel to the (x,y)-plane under the inactive portions of the coils 512, and under the respective mass blocks 552 and 558. In some implementations, the first pair of mass blocks 552 and 558 and the second pair of mass blocks 554 and 556 are attached to respective opposing cage surfaces parallel to the (x,y)-plane by a gluing process (e.g., using UV or thermally activated epoxy) or laser welding. In some implementations, the mass blocks 552, 554, 556, 558 and the cage 510 can be formed from a single piece of material. The latter approach can be more costly that the former approach as it may involve computer numerical control (CNC) machining, thus it may be less suitable to mass production scale. The former approach can be less expensive to implement than the latter approach, and thus more suitable to mass production scale, because it involves handling separate bodies that have simpler geometries and can be formed from different materials.

The mass blocks 552, 554, 556, 558 can be made from the same material as the cage 510, e.g., steel, tungsten, etc. While it is preferable to make the cage 510 and mass blocks 552, 554, 556, 558 out of nonmagnetic material (or as weakly magnetic as possible) to avoid anti-spring effects, it is not critical in allowing the haptic engine 500 to work. In some implementations, making the cage 510 and mass blocks 552, 554, 556, 558 out of diamagnetic material can improve haptic engine 500's efficiency, while potentially degrading its mechanical stability. The mass blocks 552, 554, 556, 558 extend along the driving direction over the full length of the cage 510 minus the tolerance stack-up (usually between 0.1 to 0.5 mm) to avoid overhanging the cage. Practically, this can mean a 90%, 95% or 99% of the length of the cage 510 depending on dimension and assembly tolerances. A cross-section of the mass blocks 552, 554, 556, 558 is determined in the following manner. A mass-block thickness along the transverse direction, here the y-axis, is measured from the edge of the cage 510 to the inner diameter of the coil minus the separation between the attached mass 552, 554, 556, 558, and the magnetic plates 504 to avoid mechanical interference. In practice, the mass-block thickness (usually between 0.1 to 0.5 mm) depends on dimension and assembly tolerance and can be 50%, 80% or 90% of the width of the inactive portions of the coils 512, for instance. And, a mass-block height along the height of the haptic engine 500, here the z-axis, is measured from the surface of the cage 510 to the inner surface of the engine housing 502 minus enough separation to avoid mechanical interference. In practice, this dimension (usually between 0.1 to 0.5 mm) depends on dimension and assembly tolerance and can be 50%, 80% or 90% of the distance between the surfaces of the cage 510 and housing surfaces that parallel to the (x,y)-plane, for instance.

Note that the example of mass arrangement shown in FIGS. 5A-5B is mirror-symmetric relative to a symmetry axis of the cage 510 parallel to the driving direction. Thus, the weight added in this manner to the cage 510 does not cause the cage to become unbalanced along the driving direction. In contrast, if similar mass blocks were added to the cage of a conventional haptic engine (e.g., like the one illustrated in FIG. 8), the mass blocks on each side of the cage would be (i) shorter than the full length of the cage by a length of the missing corners, and (ii) shifted from each along the driving direction by a length of the contact springs. Such a mass arrangement would not be mirror-symmetric relative to a symmetry axis of the cage of the conventional haptic engine parallel to the driving direction. Thus, the weight added in this manner to the cage of the conventional haptic engine would cause the cage to become even more unbalanced along the driving direction than it already is.

The pair of mass blocks 552, 558 disposed on one side of the cage 510 and the pair of mass blocks 554, 556 disposed on the opposing side of the case, as shown in FIGS. 5A-5B, can prevent the cage from crashing into the magnetic plates 504 normal to the direction of motion, here along the z-axis. Here, if the cage 510 were to move uncontrollably in the z-direction, then the mass blocks 552, 554, 556, 558 would crash into the housing surfaces parallel to the (x,y)-plane, instead of the cage crashing into the magnetic plates 504. In the conventional haptic engine shown in FIG. 8, crash stopping masses would be added over the unusable cage volume extending along the y-axis, thus further unbalancing the cage along the driving direction.

Referring again to FIGS. 5A-5B, the driving currents can be delivered to the secondary FPC 506 through a primary FPC (not shown) attached to the housing 502 as either one of the primary FPC 120, 220, 320 or 420 is attached to the corresponding housing 102, 202B, 302, 402. In the case of the haptic engine 500, the housing-attached primary FPC can be coupled with the cage-attached secondary FPC 506 through a corresponding flexure 150, 250, 350 or 450. Additionally, although not explicitly shown in FIGS. 5A-5B, a sensing system of the haptic engine 400 can be arranged and configured as either the sensing system 105 described above in connection with FIG. 1A or the sensing system 205 described above in connection with FIG. 2A. As the cage 510 is being driven by the driving system 501 along the x-axis, the sensing system of the haptic engine 500 can be operated to sense displacements of the cage in the X, Y and Z directions and detect the cage's tilt $\Phi$, as described above in connection with either the sensing system 105 or the sensing system 205.

Figure 6:
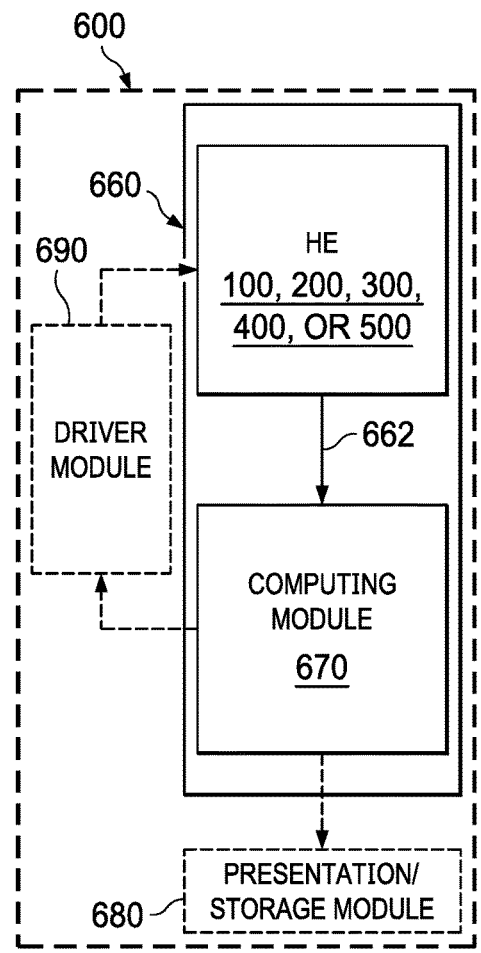
FIG. 6 shows an example of a displacement measurement system that includes a haptic engine.

FIG. 6 shows a displacement measurement system 660 that includes one of the haptic engines 100, 200, 300, 400 or 500 and a computing module 670 coupled to the haptic engine through a sensing channel 662. The computing module 670 includes a digital signal processor, which uses the Hall voltage signals output by the Hall-effect sensors 108, 208, to (i) determine the displacement $\Delta X$ of the cage 110, 210, 310, 410, 510 and (ii) detect the cage's unwanted displacements $\Delta Z$, $\Delta Y$ and $\Delta \Phi$. In some implementations, when the computing module 670 receives the Hall voltage signals as analog signals, the computing module includes analog-to-digital converters (ADCs) to digitize the received analog signals, so the digital signal processor uses the digitized Hall voltage signals for calculating the cage displacement(s). In other implementations, an ASIC located at the haptic engine 100, 200, 300, 400 or 500 digitizes the Hall voltage signals prior to transmitting them to the computing module 670 over the sensing channel 662. In this manner, the calculated mass displacements $\Delta X$ and/or the detected cage's unwanted displacements $\Delta Z$, $\Delta Y$ and $\Delta \Phi$ can be provided by the displacement measurement system 660 to a driver module 690, which in turn suitably uses the provided information to control the driving system 101, 201, 301, 401, 501 of the haptic engine 100, 200, 300, 400 or 500. Alternatively or additionally, the cage displacements $\Delta X$ and/or the cage's unwanted displacements $\Delta Z$, $\Delta Y$ and $\Delta \Phi$ can be provided by the displacement measurement system 660 for display or storage to a presentation/storage module 680. Moreover, the displacement measurement system 660 can be integrated in a computing device 600, e.g., in a smartphone, tablet, watch or any other electronic device that uses an LRA module for haptic feedback, either by itself or along with one or both of the driver module 690 and the presentation/storage module 680.

Figure 7:
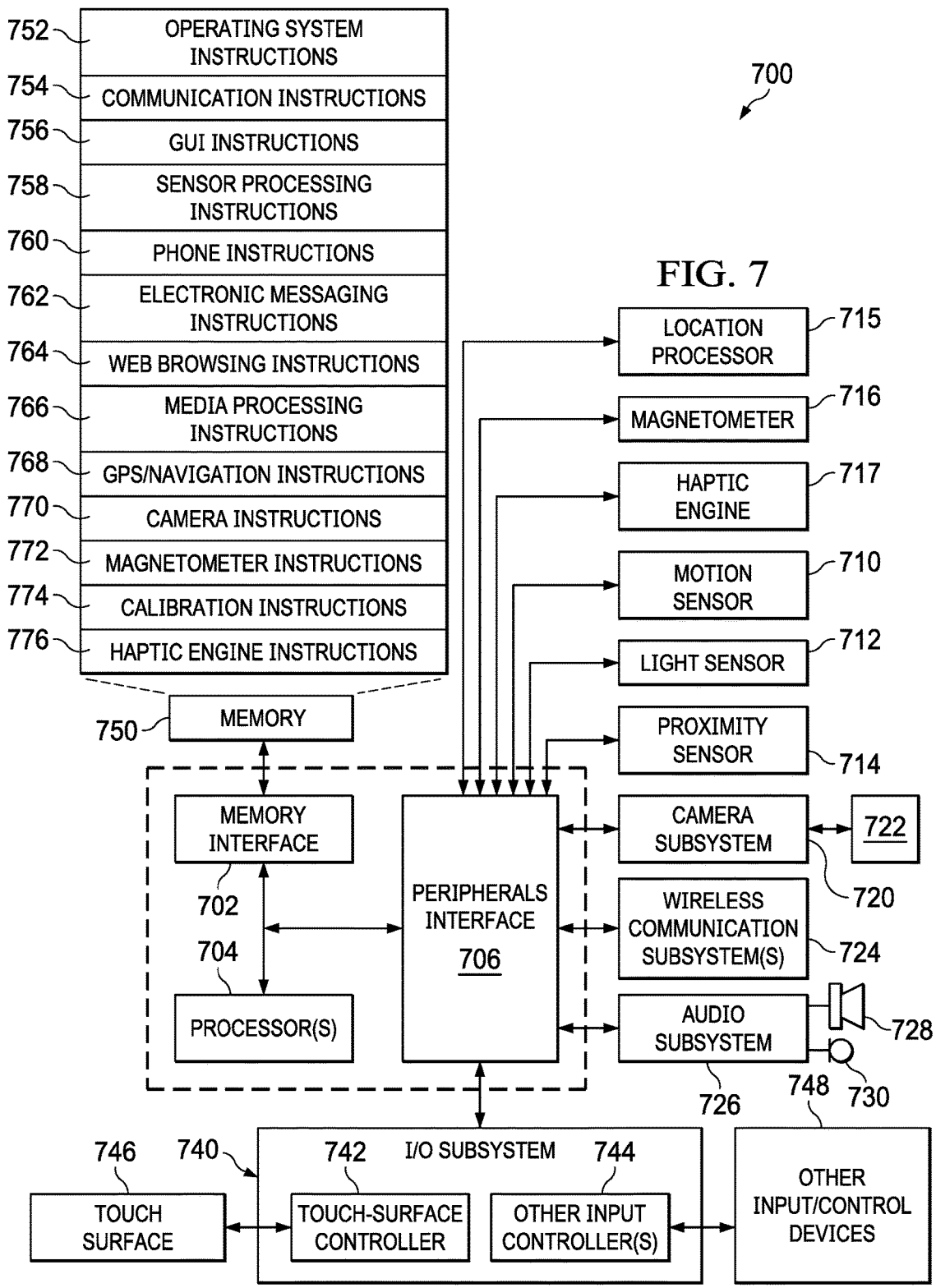
FIG. 7 shows an example of mobile device architecture that uses a haptic engine as the ones described in reference to FIG. 1-6.

FIG. 7 is a diagram of an example of mobile device architecture that uses one of the haptic engines described in reference to FIGS. 1-5, according to an embodiment. Architecture 700 may be implemented in any mobile device for generating the features described in reference to FIGS. 1-6, including but not limited to smart phones and wearable computers (e.g., smart watches, fitness bands). Architecture 700 may include memory interface 702, data processor(s), image processor(s) or central processing unit(s) 704, and peripherals interface 706. Memory interface 702, processor(s) 704 or peripherals interface 706 may be separate components or may be integrated in one or more integrated circuits. One or more communication buses or signal lines may couple the various components.

Sensors, devices, and subsystems may be coupled to peripherals interface 706 to facilitate multiple functionalities. For example, motion sensor(s) 710, light sensor 712, and proximity sensor 714 may be coupled to peripherals interface 706 to facilitate orientation, lighting, and proximity functions of the device. For example, in some embodiments, light sensor 712 may be utilized to facilitate adjusting the brightness of touch surface 746. In some embodiments, motion sensor(s) 710 (e.g., an accelerometer, rate gyroscope) may be utilized to detect movement and orientation of the device. Accordingly, display objects or media may be presented according to a detected orientation (e.g., portrait or landscape).

Haptic engine 717, under the control of haptic engine instructions 772, provides the features described in reference to FIGS. 1-5, such as, for example, implementing haptic feedback (e.g., vibration). In addition to its components described above in connection with FIGS. 1-5, the haptic engine 717 can include one or more actuators, such as piezoelectric transducers, electromechanical devices, and/or other vibration inducing devices, which are mechanically connected to an input surface (e.g., touch surface 746). Drive electronics (e.g., 690) coupled to the one or more actuators cause the actuators to induce a vibratory response into the input surface, providing a tactile sensation to a user touching or holding the device.

Other sensors may also be connected to peripherals interface 706, such as a temperature sensor, a barometer, a biometric sensor, or other sensing device, to facilitate related functionalities. For example, a biometric sensor can detect fingerprints and monitor heart rate and other fitness parameters. In some implementations, a Hall sensing element in haptic engine 717 can be used as a temperature sensor.

Location processor 715 (e.g., GNSS receiver chip) may be connected to peripherals interface 706 to provide georeferencing. Electronic magnetometer 716 (e.g., an integrated circuit chip) may also be connected to peripherals interface 706 to provide data that may be used to determine the direction of magnetic North. Thus, electronic magnetometer 716 may be used to support an electronic compass application.

Camera subsystem 720 and an optical sensor 722, e.g., a charged coupled device (CCD) or a complementary metal-oxide semiconductor (CMOS) optical sensor, may be utilized to facilitate camera functions, such as recording photographs and video clips.

Communications functions may be facilitated through one or more communication subsystems 724. Communication subsystem(s) 724 may include one or more wireless communication subsystems. Wireless communication subsystems 724 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 724 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 724 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 726 may be coupled to a speaker 728 and one or more microphones 730 to facilitate voice-enabled functions, such as voice recognition, voice replication, digital recording, and telephony functions. In an embodiment, audio subsystem includes a digital signal processor (DSP) that performs audio processing, such as implementing codecs.

I/O subsystem 740 may include touch controller 742 and/or other input controller(s) 744. Touch controller 742 may be coupled to a touch surface 746. Touch surface 746 and touch controller 742 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 746. In one embodiment, touch surface 746 may display virtual or soft buttons and a virtual keyboard, which may be used as an input/output device by the user.

Other input controller(s) 744 may be coupled to other input/control devices 748, such as one or more buttons, rocker switches, thumb-wheel, infrared port, USB port, and/or a pointer device such as a stylus. The one or more buttons (not shown) may include an up/down button for volume control of speaker 728 and/or microphone 730.

In some embodiments, device 700 may present recorded audio and/or video files, such as MP3, AAC, and MPEG video files. In some embodiments, device 700 may include the functionality of an MP3 player and may include a pin connector for tethering to other devices. Other input/output and control devices may be used.

Memory interface 702 may be coupled to memory 750. Memory 750 may include high-speed random access memory or non-volatile memory, such as one or more magnetic disk storage devices, one or more optical storage devices, or flash memory (e.g., NAND, NOR). Memory 750 may store operating system 752, such as Darwin, RTXC, LINUX, UNIX, OS X, iOS, WINDOWS, or an embedded operating system such as VxWorks. Operating system 752 may include instructions for handling basic system services and for performing hardware dependent tasks. In some embodiments, operating system 752 may include a kernel (e.g., UNIX kernel).

Memory 750 may also store communication instructions 754 to facilitate communicating with one or more additional devices, one or more computers or servers, including peer-to-peer communications. Communication instructions 754 may also be used to select an operational mode or communication medium for use by the device, based on a geographic location (obtained by the GPS/Navigation instructions 768) of the device.

Memory 750 may include graphical user interface instructions 756 to facilitate graphic user interface processing, including a touch model for interpreting touch inputs and gestures; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS (e.g., GPS, GLOSSNAS) and navigation-related processes and functions; camera instructions 770 to facilitate camera-related processes and functions; and haptic engine instructions 772 for commanding or controlling haptic engine 717 and to provide the features described in reference to FIGS. 1-5.

Each of the above identified instructions and applications may correspond to a set of instructions for performing one or more functions described above. These instructions need not be implemented as separate software programs, procedures, or modules. Memory 750 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C# and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A haptic engine, comprising:
   a housing;
   a cage disposed within the housing and arranged to be driven relative to the housing along a driving direction;
   a driving system disposed within the housing, the driving system comprising
      a magnet that is coupled with the housing to produce a magnetic field along a magnetic field direction orthogonal to the driving direction, and
      one or more coils supported by the cage and arranged to interact with the magnetic field to cause the cage to be driven when corresponding driving currents are being provided to the coils;
   flexible printed circuitry configured to provide the driving currents to the coils, the flexible printed circuitry comprising
      (i) a primary flexible printed circuit (FPC) having a first primary FPC portion being attached to the housing, and a second primary FPC portion suspended inside the housing along a transverse direction orthogonal to the driving direction and the magnetic field direction,
      (ii) a secondary FPC attached to the cage and electrically connected to the coils, and
      (iii) an intermediary FPC having an end that is attached to the cage and electrically connected to the secondary FPC, the intermediary FPC being suspended inside the housing along the transverse direction, and the intermediary FPC having an end distal from the cage that is attached, and electrically connected, to the second primary FPC portion at a joint, the joint being oriented parallel to the magnetic field direction and spaced apart from both the cage and the housing; and
   a sensing system having a first portion coupled with the housing and a second portion coupled with the cage, the sensing system arranged and configured to produce sensing signals corresponding to changes in position of the cage along the driving direction when supplying the driving currents to the coils.

2. The haptic engine of claim 1, wherein
   the housing comprises a flange oriented parallel to the transverse direction and magnetic field direction, and
   an end of the first primary FPC portion adjacent to the second primary FPC portion is attached to the flange.

3. The haptic engine of claim 2, wherein the first primary FPC portion is attached to a top cover surface of the housing orthogonal to the transverse direction, and bends away from the top cover surface about a bending axis parallel to the magnetic field direction prior to attaching at the flange.

4. The haptic engine of claim 2, wherein the first primary FPC portion is attached to a base surface of the housing orthogonal to the magnetic field direction, and bends away from the base surface about a bending axis parallel to the transverse direction prior to attaching at the flange.

5. The haptic engine of claim 1, wherein the second primary FPC portion is bent away from the housing about a bending axis parallel to the magnetic field direction, the bend being near the housing and distal from the joint.

6. The haptic engine of claim 5, wherein the second primary FPC portion has first thickness in a bend region and a second thickness outside the bend region, such that the first thickness is smaller than the second thickness.

7. The haptic engine of claim 5, wherein the second primary FPC portion has a first number of layers in a bend region and a second number of layers outside the bend region, such that the first number of layers is smaller than the second number of layers.

8. The haptic engine of claim 1, wherein electrical connections of the intermediary FPC with the second primary FPC portion and the secondary FPC are formed through SMT reflow soldering, conductive adhesive gluing, or laser welding.

9. A haptic engine comprising:
   a housing;
   a cage disposed within the housing and arranged to be driven relative to the housing along a driving direction;
   a driving system disposed within the housing, the driving system comprising
      a magnet that is coupled with the housing to produce a magnetic field along a magnetic field direction orthogonal to the driving direction, and
      one or more coils supported by the cage and arranged to interact with the magnetic field to cause the cage to be driven when corresponding driving currents are being provided to the coils;
   flexible printed circuitry configured to provide the driving currents to the coils, the flexible printed circuitry comprising (i) a primary flexible printed circuit (FPC) attached to the housing along the driving direction, and (ii) a secondary FPC having a first secondary FPC portion being attached to the cage and electrically connected to the coils, and a second secondary FPC portion being suspended inside the housing by bending away from the cage about a first bending axis parallel to the magnetic field direction, extending along a transverse direction orthogonal to the driving direction and the magnetic field direction, and bending toward the housing about a second bending axis parallel to the first bending axis, and the second secondary FPC portion having an end distal from the cage that is attached to the housing and electrically connected to the primary FPC; and a sensing system having a first portion coupled with the housing and a second portion coupled with the cage, the sensing system arranged and configured to produce sensing signals corresponding to changes in position of the cage along the driving direction when supplying the driving currents to the coils.

10. The haptic engine of claim 9, further comprising a fastener disposed on the cage to attach the second secondary FPC to the cage at a fastening location of the second secondary FPC, wherein the second secondary FPC bends away from the cage at the fastening location.

11. The haptic engine of claim 9, wherein an electrical connection of the second secondary FPC portion with the primary FPC is formed through SMT reflow soldering, conductive adhesive gluing, or laser welding.

12. The haptic engine of claim 9, wherein the second secondary FPC portion has
a first thickness in a bend region corresponding to either of the first or the second bending axes, and
a second thickness outside the bend region, such that the first thickness is smaller than the second thickness.

13. The haptic engine of claim 9, wherein the second secondary FPC portion has
a first number of layers in a bend region corresponding to either of the first or the second bending axes, and
a second number of layers outside the bend region, such that the first number of layers is smaller than the second number of layers.

14. The haptic engine of claim 9, wherein the flexible printed circuitry comprises multiple conducting traces to independently provide corresponding driving currents to individual ones of the coils.

15. The haptic engine of any claim 14, wherein
the multiple conducting traces further to provide connections between additional electrical components on the secondary FPC to the primary FPC, and
the additional electrical components are different from the one or more coils.

16. The haptic engine of claim 9, wherein the sensing system comprises
a sensing magnet that is coupled with the cage and produces a sensing magnetic field along a sensing direction orthogonal to the driving direction, and
a first Hall-effect sensor and a second Hall-effect sensor disposed on the primary FPC portion attached to the housing at respective first and second locations of the housing, the second location being separated from the first location along the driving direction, each of the Hall-effect sensors being spaced apart from the sensing magnet along the sensing direction and configured to produce a respective one of the sensing signals as a Hall voltage signal corresponding to changes of the sensing magnetic field at the location of the respective one of the sensors caused when driving the cage.

17. The haptic engine of claim 16, wherein the sensing direction is parallel to the magnetic field direction.

18. The haptic engine of claim 16, wherein the sensing direction is orthogonal to the magnetic field direction.

19. The haptic engine of claim 9, comprising
mass blocks attached to the cage,
wherein each mass block extends over a length of the cage along the driving direction and is disposed in corresponding inactive areas of the coils.

20. The haptic engine of claim 19, wherein the mass blocks and the cage comprise the same material.

21. The haptic engine of claim 19, wherein the mass blocks and the cage comprise different materials.

22. The haptic engine of claim 19, wherein the mass blocks are taller than the magnet coupled with the housing to prevent physical contact between the cage and the magnet during an uncontrolled motion event along the magnetic field direction.

23. A displacement measurement system comprising:
the haptic engine of claim 9; and
a digital signal processor configured to determine displacements of the cage based on the sensing signals.

24. A computing system that includes the displacement system of claim 23.

25. The computing system of claim 24 comprises one of a smartphone, a laptop and a watch.

* * * * *